US012732265B2

(12) United States Patent
Ciochina et al.

(10) Patent No.: US 12,732,265 B2
(45) Date of Patent: Sep. 8, 2026

(54) METHOD TO DETERMINE VALUE AS TIMING ADVANCE AND TO PERFORM HANDOVER FROM SOURCE CELL TO TARGET CELL

(71) Applicant: Mitsubishi Electric Corporation, Tokyo (JP)

(72) Inventors: Cristina Ciochina, Rennes Cedex (FR); Nicolas Gresset, Rennes Cedex (FR)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 312 days.

(21) Appl. No.: 18/288,959

(22) PCT Filed: Nov. 8, 2021

(86) PCT No.: PCT/JP2021/041816

§ 371 (c)(1),
(2) Date: Oct. 30, 2023

(87) PCT Pub. No.: WO2022/234686

PCT Pub. Date: Nov. 10, 2022

(65) Prior Publication Data

US 2024/0204866 A1 Jun. 20, 2024

(30) Foreign Application Priority Data

May 5, 2021 (EP) .................................... 21305581

(51) Int. Cl.
*H04B 7/185* (2006.01)
*H04W 56/00* (2009.01)

(52) U.S. Cl.
CPC .... *H04B 7/18541* (2013.01); *H04W 56/0045* (2013.01)

(58) Field of Classification Search
None
See application file for complete search history.

(56) References Cited

U.S. PATENT DOCUMENTS 12,464,482 B2 * 11/2025 Wang ..................... H04B 7/155
12,464,597 B2 * 11/2025 Shimoda ........... H04B 7/06964
(Continued)

FOREIGN PATENT DOCUMENTS

EP 3447936 A1 2/2019
EP 3799470 A1 3/2021
(Continued)

OTHER PUBLICATIONS

European Communication pursuant to Article 94(3) EPC for European Application No. 21 305 581.7, dated Mar. 25, 2025.
(Continued)

*Primary Examiner* — Umar Cheema
(74) *Attorney, Agent, or Firm* — Birch, Stewart, Kolasch & Birch, LLP

(57) ABSTRACT

The present invention relates to a method implemented by a user equipment to determine a value to be used as a timing advance in a target cell in a network comprising a satellite communication network, said method comprising:

determining the value to be used as a timing advance in a target cell, before the user equipment transmits a first signal to a target base station, based on:

a data related to a timing advance in a source cell, a first parameter, said first parameter being determined by the user equipment, and a second parameter, said second parameter being specific to a couple of cells formed by the source cell and the target cell.

16 Claims, 8 Drawing Sheets

(56) References Cited

U.S. PATENT DOCUMENTS

| | | | | |
|---|---|---|---|---|
| 2016/0323032 | A1 | 11/2016 | Ulupinar et al. | |
| 2020/0196263 | A1 | 6/2020 | Heyn et al. | |
| 2021/0029658 | A1 | 1/2021 | Mahalingam et al. | |
| 2022/0345961 | A1 | 10/2022 | Tao et al. | |
| 2023/0133633 | A1* | 5/2023 | Park | H04W 56/0015 370/331 |

FOREIGN PATENT DOCUMENTS

| | | | | |
|---|---|---|---|---|
| WO | WO 2019/195457 | A1 | 10/2019 | |
| WO | WO-2021166545 | A1 * | 8/2021 | H04W 84/06 |

OTHER PUBLICATIONS

Lenovo et al., "Discussion on NTN TA indication," 3GPP TSG RAN WG1 #103-e, R1-2008923, e-Meeting, Oct. 26-Nov. 13, 2020, 3 pages total.

* cited by examiner

METHOD TO DETERMINE VALUE AS TIMING ADVANCE AND TO PERFORM HANDOVER FROM SOURCE CELL TO TARGET CELL

TECHNICAL FIELD

The present invention relates to the field of telecommunication using non-terrestrial networks, and more specifically to the access to satellite communication networks.

BACKGROUND ART

In satellite communication networks with non-geostationary orbit satellites, satellites are in constant movement with respect to the Earth surface, leading to either sliding or shape-changing satellite cells on the Earth surface over time. User equipment (UEs) within such a satellite communication network and located in a given geographical area on the Earth surface classically perform handovers in order to remain connected to the network via a satellite cell which covers their geographic area. Such handovers require an important amount of signaling and involve consuming an important amount of radio resources.

Particular characteristics of the satellite communication network, such as satellites architectures with steerable satellite beams, can lead to abrupt changes of coverage on the Earth surface, where a high number of UEs needs to simultaneously switch from one cell to another within a very limited amount of time. There is therefore an increased risk of collisions and failed access procedures for UEs when performing handovers through existing methods in such cases. Other particular characteristics of the satellite communication network, such as satellites architectures with fixed satellite beams (moving cells at the surface of the Earth), can lead to continuous progressive handover of UEs from one cell to the next cell, which causes a large amount of signaling when applying current handover procedures.

SUMMARY OF INVENTION

The present invention addresses such problems.

It is proposed, in a first aspect of the invention, a method implemented by a user equipment to determine a value to be used as a timing advance in a target cell in a network comprising a satellite communication network, the user equipment being connected to a source base station corresponding to a source cell, the target cell corresponding to a target base station, the source cell and the target cell being supported by one or more satellites of the satellite communication network, at least the source cell being supported by a non-geostationary orbit satellite of the satellite communication network, said method comprising:

- determining the value to be used as a timing advance in the target cell, before the user equipment transmits a first signal to the target base station, based on:
  - a data related to a timing advance in the source cell,
  - a first parameter, said first parameter being determined by the user equipment, and
  - a second parameter, said second parameter being specific to a couple of cells formed by the source cell and the target cell.

Therefore, to perform an uplink transmission between the user equipment and the target base station, that is, the base station to which the user equipment connects to after performing a handover procedure, it is no longer necessary that the user equipment receives a timing advance from the target base station (which usually estimates the timing advance and sends it to the UE during the handover). Therefore, less signaling and less computing are required during the handover. In addition, such procedure does not require a user equipment to be able to localize itself (for example, using a global navigation satellite system or GNSS) or a user equipment with important computing ability.

By determining its own value to be used as a timing advance in the target cell, the user equipment can perform a handover to the target cell which requires less computing, less time and at least less signaling than a classical handover procedure. Indeed, during a classical handover procedure, the target base station (managing the target cell) estimates the value to be used as a timing advance of the user equipment in the target cell based on signals sent by the user equipment to the target base station. For example, in wireless communication standard such as LTE, Advanced LTE or New Radio (NR), the existing procedure to estimate the timing advance of a user equipment in a given base station is performed based on the first message (Msg1 of the RACH procedure) of the RACH procedure received by the base station from the user equipment. Later in the same RACH procedure, the value of the timing advance of the user equipment in the base station is estimated by the base station and is transmitted (Msg2 of the RACH procedure) to the UE which uses it to introduce a time delay when emitting signals through the target cell.

Therefore, the invention enables to reduce the computing and signaling during the handover which for example in the context of most wireless standard (for example, LTE, LTE-Advanced or New Radio) may enable to remove some of the messages during the handover procedure (for example the RACH preamble and/or the second message (Msg2) sent by the target base station during the RACH procedure, and/or in some cases skip the RACH procedure altogether). Removing those messages enables to reduce the handover latency and the amount of signaling exchanged during handover procedure. In addition, removing those messages, or at least applying a timing advance offset while sending those messages, also enables to release important amount of radio resources, since the exchanges performed between the target base station and the user equipment during the handover procedure when the user equipment (and eventually the target base station) does not yet implement a time offset based on the timing advance value (to compensate the time required for the signal to propagate) require the target base station to reserve much more radio resources than a classic signaling. Indeed, the target base station cannot (or only poorly) predict the time of reception of these exchanges, therefore to avoid interferences with other transmissions (and thus to reduce the number of unsuccessful access procedures) the target base station must reserve important radio resources to take into account possible delay differences due to signal propagation in a large satellite cell. Therefore, by determining the value to be used as a timing advance in the target cell without requiring exchanges with the target base station beforehand enables the network to reduce the amount of radio resource reserved for the RACH procedure during handover and time consumed in an access procedure related to handover.

The user equipment can thus apply such determined value to be used as a timing advance in the target cell in an uplink transmission performed with the target base station during the handover procedure (for example, Msg1 or Msg3 of the 4-step RACH procedure, or an uplink message during a modified RACH procedure) or after the handover procedure (for example, the first uplink transmission performed after the handover) or even the first uplink transmission performed with the target base station when, for example, no RACH procedure is required during handover. That is, by determining the value to be used as a timing advance in the target cell itself beforehand, the user equipment is able to directly introduce the relevant time delay in its very first uplink transmission to the target base station which simplifies and sometimes enables to skip the existing access procedure through the RACH procedure.

Such method may be applicable in an overall and generic way, without any specific condition on the satellite communication network architecture, the satellite movements, which the user equipment has, by default, no knowledge of (by default being understood here as without receiving such information from the network, for instance via serving base station).

A network comprising a satellite communication network refers to a Non-Terrestrial Network (NTN) using satellites to emit and receive radiofrequency signals to/from different devices including user equipment (or UEs), thus enabling a wireless communication.

A user equipment (or UE) refers to any device used by an end-user to communicate. Any other terminologies (for example, a mobile terminal, a mobile station, a personal digital assistant, a wireless modem, a handheld device, etc.) used to refer to any wireless devices used to communicate at least via the satellite communication network are here encompassed within the term user equipment.

A non-geostationary orbit satellite refers to a satellite of the satellite communication network which moves with respect to the Earth surface, such movement following a predefined satellite constellation dynamic and/or a satellite ephemeris, which is computed within a core entity of the satellite communication network.

Each satellite of the satellite communication network projects, through one or several satellite beams (or spotbeams), a satellite footprint (or a coverage zone of the satellite) on the Earth surface, such footprint defining a geographic area of coverage of the satellite. A satellite footprint is composed by the beam footprints of the different satellite beams of the satellite.

One or several beam footprints of a satellite form a specific coverage zone called a cell.

Such cell is supported by one or several satellite beams of the satellite. The radio resources and signaling within a cell are managed by a base station.

The present description is not limited to a specific standard, however for the sake of simplicity, the present description will be detailed in the context of the New Radio (NR) standard. In NR standard, a base station managing a cell is referred to as a gNodeB or gNB.

Thus, a cell corresponding to a base station refers to the fact that a given cell formed by one or several satellite beams is managed by a given base station or gNB. Such base station manages the radiofrequency resources allocated to the given cell and the signals exchanged through the given cell are managed, at least, by the given base station. Each base station corresponds to a cell and each cell corresponds to a base station. A cell is formed by one or several satellite beams and a satellite thus supports one or several cells.

Connecting to a cell or connecting to its corresponding base station should be used interchangeably. However, for the sake of clarity, the base station will refer to a network hardware/software entity which is able to receive, process and emit signals within its corresponding cell, which refers to a geographic coverage zone of the base station on the Earth surface.

Each satellite is linked to a gateway, corresponding for example to a ground station serving as an intermediary to transmit data between satellites and the core network. The wireless link between a satellite and a gateway is referred to as a feeder link.

In the present context of non-geostationary orbit satellites, satellites of the satellite communication network move with respect to the Earth surface, following predictable ephemerides and according to a predefined network topology. As a consequence, the different positions and successions of cells on the Earth surface throughout time is also predictable by the network. Considering a fixed geographic area on the Earth surface covered by a cell at a current time, the cells covering such geographic area before the current time are referred to as the cells upstream to the cell and the cells covering such geographic area after the current time are referred to as the cells downstream the cell.

The coverage conditions of such a fixed geographic area will regularly change throughout time as the upstream cells, the cell and downstream cells successively cover the fixed geographic area, sometimes by overlapping each other. In certain network architectures, the satellite deploys beams which are fixed with respect to the satellite (mobile with respect to the Earth surface), and downstream cells progressively replace the current cell. In other network architectures, the satellite deploys steerable beams pointing towards fixed points on the Earth surface. In such case, a change of coverage or cell switch occurs in a fixed geographic area when a serving cell is replaced by a downstream cell. Such change of coverage can occur in a soft switch scenario, when the downstream cell is switched on the fixed geographic area before the serving cell is switched off from the fixed geographic area (the serving and downstream cells thus overlap), or in a hard switch scenario, when the serving cell is switched off from the fixed geographic area before the downstream cell is switched on the fixed geographic area.

In particular, for user equipment (or UEs) in the fixed geographic area, successive changes of coverage require such UEs to perform handovers in order to maintain a connectivity to the satellite communication network. Such handovers can occur in all of the above cited scenarios, and can result from:

- an inter-satellite switch, when a serving cell from a satellite is replaced by a downstream cell from another satellite,
- an intra-satellite switch, when a serving cell from a satellite is replaced by a downstream cell from the same satellite,
- a gateway switch, when the satellite of the serving cell switches its feeder link from one gateway to another gateway, leading to a serving cell being replaced by a downstream cell with different connectivity properties.

Such various natures of changes of coverage in a fixed geographic area on the Earth surface lead to various scenarios of handovers which must be performed by more or a less numerous UEs in a more or less abrupt way. Apart from the network dynamic properties such as the satellite ephemerides and the soft/hard switch scenarios, some characteristics of the satellite architecture also influence the handover conditions of UEs.

The beams of the satellites may be fixed beams or steerable beams. In the case of satellites with fixed beams, the projecting satellite beam footprints (and thus the cells) on the Earth surface are moving as the satellites and their spotbeams move with respect to the Earth surface. In the case of satellites with steerable beams, the spotbeams of satellites are moving so that the satellite beam footprints (and thus the cells) are fixed—at least partially—on a geographical area on the Earth surface for a known duration. In such a scenario, the movement of satellite beams is adjusted in order to “compensate” the continuous movement of satellites. Such known duration depends on the visibility period of a satellite with respect to a given geographic area, during which UEs within the fixed geographic area have a sufficient elevation angle in order to be covered by the satellite. When the elevation angles of UEs—especially UEs located in the periphery of a serving cell—become insufficient—below a given threshold for example—, the serving cell currently covering the geographic area is replaced by a downstream cell (of the same satellite or of a different satellite of the network) and a change of coverage is considered to occur in the geographic area.

If at least the source cell covering UEs is deployed by a satellite with steerable beams (and thus fixed satellite beam footprints), such UEs potentially need to be handed over to a downstream cell (thus corresponding to UEs target cell) in relatively much shorter time and in a more massive way compared to the scenario with fixed-beam satellites, since there is no gradual change of coverage as the cells move on the Earth surface. Such massive and relatively simultaneous handovers also occur in the case of a gateway switch for instance. Such diverse handover scenarios therefore lead to a need for an increasing efficiency of handovers and access procedures overall which the present disclosure addresses.

By a source cell, it is referred to the cell a user equipment is connected to before performing the handover. Such source cell is therefore a serving cell of the user equipment and the user equipment is able to both send and receive signals to/from the base station corresponding to the source cell (which are uplink and downlink communications for example), such a base station being referred to as the source base station.

A target cell refers to the cell a user equipment will connect to from the source cell through a handover procedure, the target cell being managed by a base station referred to as the target base station. The target cell is a downstream cell to the source cell and will cover the fixed geographic area in which is the user equipment in replacement to the source cell. Two cells are identified as source and target cells for a given user equipment.

In the context of the present disclosure, before connecting to the target cell, the user equipment is considered to be connected to the source base station (and thus is covered by the corresponding source cell). For example, the user equipment is in an RRC connected mode and has successfully connected to the source base station by performing either an initial access procedure or a prior handover procedure.

A timing advance in a cell refers to a time difference between the sending time of an uplink communication from a user equipment through a cell and the reception of a downlink communication through that same cell, from the perspective of the user equipment. The timing advance is variable and depends on a propagation delay between a user equipment and a predefined network reference point, such as the base station managing the cell for instance or the satellite supporting the cell, or any reference point between those two points. It is moreover proper to each user equipment, depending on its location on the Earth surface. The timing advance aims at compensating such propagation delay: the user equipment, after obtaining such a time advance, advances the time of its uplink transmission through the cell by an amount of time corresponding to the timing advance. When each user equipment under the coverage of a given cell advances the time of its own uplink transmission through the cell by an amount of time corresponding to its own timing advance, it ensures that all uplink transmissions reach the network side (that is, the network reference point as defined) respectively at times corresponding to the radio resources to which these transmissions where assigned. Moreover, at such reference point, both uplink and downlink transmissions are synchronized.

The reference point is set as a parameter of the network. For example, the network reference point is set at the base station, which is the case for terrestrial communication networks for instance. In that case, implementing the UE specific timing advances at each user equipment ensures that all uplink transmissions from such UEs reach the base station in a synchronized manner regarding the base station and that uplink and downlink transmissions are time aligned at the base station. In another example, the network reference point may be located at the satellite. In that case, implementing the UE specific timing advances at each user equipment ensures that all uplink transmissions from such UEs reach the satellite in a synchronized manner regarding the base station and that uplink and downlink transmissions are time aligned at the satellite. In another example, the network reference point may be located anywhere on the feeder link linking the satellite and its gateway.

Such a network reference point is predefined for a given cell and is fixed with respect to its distances (some being possibly null) to the corresponding base station, cell and gateway.

A value to be used as a timing advance in the target cell refers to a time-related value determined by the user equipment in order for it to advance the time of its uplink transmission through the target cell by an amount of time corresponding to that value. Such value is determined by the user equipment, for example, by calculation, implementation and/or estimation.

The value to be used as a timing advance in the target cell may be determined by the user equipment before the user equipment transmits a first signal to the target base station. Before the user equipment transmits a first signal to the target base station refers to a time prior to the moment the user equipment initiates a first uplink transmission towards the target base station to perform a handover procedure to access the target cell. That is, the value to be used as a timing advance in the target cell is determined by the user equipment without requiring the reception of signals from the target base station by the user equipment.

The value to be used as a timing advance in the target cell can be determined by the user equipment in order to perform a handover from the source base station to the target base station, such value to be used as a timing advance in the target cell being for example first applied in the first uplink transmission or message sent to the target base station by the user equipment to initiate an access procedure to the target base station (which can correspond to the existing RACH procedure, a modified RACH procedure or a different access procedure).

A data related to a timing advance in the source cell refers to a data obtained by the user equipment and enabling it to deduce the timing advance in the source cell. While being connected to the source base station, the user equipment has knowledge of the timing advance in the source cell. Indeed, such a timing advance in the source cell is regularly updated by the source base station as long as the user equipment sends uplink transmissions such as Physical Uplink Shared Channel (PUSCH), Physical Uplink Control Channel (PUCCH) and/or Sounding Reference Signal (SRS) to the source base station for instance. The source base station can estimate the uplink transmission arrival time from a user equipment and thus calculate the required timing advance. An updated value of the timing advance in the source cell is thus regularly sent to the user equipment by the source base station.

For example, a data related to a timing advance in the source cell may refer to an explicit value of the timing advance to be used, or a data allowing the user equipment to compute the timing advance to be used in the in the source cell, as it is sent to the user equipment by the source base station. The timing advance (or more precisely the data related to timing advance in the source cell) based on which the value to be used as a timing advance in the target cell is determined may be the last timing advance in the source cell, or a data allowing the user equipment to compute the last timing advance to be used in the in the source cell, updated by the source base station or can be any timing advance in the source cell estimated by the source base station.

In another example, a data related to a timing advance in the source cell may refer to a time variation function of the timing advance in the source cell sent by the source base station to the user equipment. Based on the time variation function of the timing advance in the source cell, the user equipment is able to update the timing advance in the source cell and thus to estimate a value of the timing advance in the source cell at a given time, and particularly at a time as close as possible to the moment the user equipment performs a handover procedure to access the target cell.

A first parameter refers to a value determined by the user equipment. For example, the first parameter can result from one or several measurements and/or one or several estimations done by the user equipment.

In another example, the first parameter can be determined by the user equipment based on an instruction or a command emitted by a network entity such as the source base station. A network entity refers here to any entity of the satellite communication network among the source base station, the target base station or any other entity other than the user equipment.

A second parameter refers to a value specific to a couple of cells (and thus to a couple of base stations). Specific to a couple of cells means that the second parameter depends on both cells of a couple of cells (that is to a pair of cells). The second parameter may be common to all the UEs in the source cell for which a handover from the source cell to the target cell will be required. For instance, all UEs being connected to a same source base station and performing a handover from that source cell to the same target cell may implement the same value of the second parameter.

The second parameter is determined by the satellite communication network. The second parameter can thus be determined by a network entity such as the source base station. The second parameter can be measured, estimated and/or calculated by the network entity. The second parameter may be determined by a user equipment.

The second parameter may be sent by the source base station to the user equipment for the determination of a value to be used as a timing advance in the target cell. The second parameter may be obtained by the user equipment through a Device-To-Device (D2D) communication.

In an embodiment of the invention, the first parameter is determined based on times of arrival at the user equipment of:

- a first signal received from the source base station, through the source cell, and
- a second signal received from the target base station, through the target cell.

This enables the user equipment to determine the first parameter as a time duration, based on times of arrival of two signals received respectively from the source base station and the target base station.

A time of arrival at the user equipment of a signal refers here to the time when the signal is received by the user equipment, such time thus being considered from the perspective of the user equipment.

A first signal received from the source base station refers to any type of signal emitted by the source base station and received by the user equipment.

A second signal received from the target base station refers to any type of signal emitted by the target base station and reaching the user equipment.

When the source cell and the target cell overlap at least partially, the user equipment may receive the first and second signals while being in this overlap part of these cells. In that case, the two signals may be received in a sufficiently small time-range referred to as the time interval. In that case, the first parameter may be determined by the user equipment as the time difference between the times of arrival of the first and second signals measured by the user equipment.

When two signals respectively from the source and target base station arrive at the user equipment in a concomitant way, the user equipment may not able to measure both times of arrival, therefore, the user equipment can only use one of these signals to determine the first parameter, thus the user equipment does not receive two signals respectively from the first and second base stations in a time interval that are usable to determine the first parameter. It is also the case when the two cells do not overlap, in that case, two signals received respectively from the first and second base stations may not be received in the time interval. Therefore, when the user equipment does not receive two signals respectively from the first and second base stations in a sufficiently small time-range, so that the user equipment may determine the first parameter as the direct time difference between the times of arrival of such signals, the method may further comprises determining the first parameter based on a time interval and:

- a first time determined based on the time of arrival of the first signal, the first time being in the time interval, and/or
- a second time determined based on the time of arrival of the second signal, the second time being in the time interval.

This embodiment may as well be implemented even when the user equipment receives two signals respectively from the first and second base stations in the time interval.

For example, the user equipment may determine the first parameter as a time difference between the first time and the second time, such first and second times respecting a time range criterion, that is, to be in the time interval. By ensuring that the first time and the second time used to determine the first parameter both belong to a time interval, it is ensured that the computing of the first parameter is not based on signals emitted by the source and target base station that are not sent at the same time or almost at the same time. Therefore, the first parameter thus accurately reflects an actual time difference between signals which are actually comparable for example since they are spaced by less than a frame, meaning that signals have actually been sent in a more or a less concomitant way. For example, if a signal sent by the source base station corresponding to a subframe #4 and another signal sent by the target base station corresponding to a subframe #6 have their respective times of arrival at the user equipment compared, the obtained first parameter would be biased by a phase difference due to the difference of time between subframe #4 of the source base station and subframe #6 of the target base station, independently from the propagation time difference between the respective two base stations and the user equipment. In this example, the first parameter preferably reflects the time difference between the respective subframes #4 of the source and target base stations (or the respective subframes #6).

By a data related to a time interval, it is understood a data related to a time range predetermined by the network and sent to the user equipment. Such time interval informs the user equipment of the first time and second time which need to be estimated. The data related to the time interval can correspond to a time window indicated by the source base station, or can also correspond to data (for example, such as a switch time between the source cell and the target cell, a starting time and an end time) based on which the user equipment is able to deduce the time interval. Such time interval can relate to information known by the network about the radio resource management of each of the source and the target base stations such as their respective subframes, slot durations or a periodicity of transmission for example.

By a first time determined based on the time of arrival of the first signal, it is understood a time value related to the first signal and that corresponds to a time in the time interval. For example, the user equipment may measure the times of arrival of the first signal and, based on this time of arrival, estimate the first time. This first time may correspond to a virtual time of arrival at the user equipment of another first signal, such another first signal being emitted by the source base station; however, the user equipment may or may not receive and/or decode it. The first signal and the another first signal are time related (for example, via a time pattern of signals emitted by the target base station), that is, the user equipment may know or deduce the time delay between the emission of the first signal and the another first signal at the source base station. Therefore, the user equipment can apply the same time difference to the measured time of arrival to deduce the virtual time of arrival, that is, the time value. For example, when the signals (emitted by the source base station) that the user equipment tracks to determine the first parameter are periodic, based on this periodicity the user equipment can determine the first time as being the time in the time interval corresponding to a number of periods from the measured time of arrival of the first signal.

By a second time determined based on the time of arrival of the second signal, it is understood a time value related to the second signal and that corresponds to a time in the time interval. For example, the user equipment may measure the times of arrival of the second signal and based on this time of arrival estimate the second time. This second time may correspond to a virtual time of arrival at the user equipment of another second signal, such another second signal being emitted by the target base station, however the user equipment may or may not receive and/or decode it. The second signal and the another second signal are time related (for example, via a time pattern of signals emitted by the target base station), that is, the user equipment may know or deduce the time delay between the emission of the second signal and the another second signal at the target base station. Therefore, the user equipment can apply the same time difference to the measured time of arrival to deduce the virtual time of arrival, that is, the time value. For example, when the signals (emitted by the target base station) that the user equipment tracks to determine the first parameter are periodic, based on this periodicity the user equipment can determine the first time as being the time in the time interval corresponding to a number of periods from the measured time of arrival of the second signal.

At least one among the first time and the second time may not correspond to the time of arrival of the first signal respectively the second signal. However, one among the first time and the second time may correspond to the time of arrival of the first signal respectively the second signal.

In another embodiment of the invention, the first parameter is determined based on an indicative value received from the source base station through the source cell.

Therefore, the first parameter can be determined by the user equipment without measuring times of arrival of signals emitted by the source and target base stations. Indeed, the user equipment can receive an indicative value from the source base station at a time when the user equipment is connected to the source base station and determine the first parameter based on the indicative value.

This is particularly relevant in the case of a gateway switch scenario. Indeed, when a satellite changes its feeder link from a gateway to another gateway, all UEs under the coverage of all cells deployed by such satellite encounter a common time switch of their respective timing advances. In this case, the source base station may be able to determine the common time shift value of the respective values of timing advance to be applied by all user equipments under the coverage of the satellite. Each UE can thus receive an indicative value indicating the common time shift value. The indicative value thus enables the user equipment to directly deduce the first parameter as a fixed predefined value.

The indicative value received from the source base station may be received by the user equipment as a unicast, a groupcast or a broadcast transmission emitted by the source base station and may be embedded in an instruction message or a handover command from the source base station for example. Such indicative value gives a direct indication on how to determine the first parameter, for instance by providing an explicit time-related value to be used or by leading the user equipment to determine the first parameter as a fixed predefined value (which can be preconfigured in the user equipment).

In an embodiment of the invention, the method further comprises receiving a value from the source base station through the source cell, said value corresponding to the second parameter.

The second parameter is determined by the satellite communication network, that is by a network entity of the satellite communication network, such as the source base station.

The second parameter is sent by the source base station to the user equipment for the determination of the value to be used as a timing advance in the target cell.

The second parameter can also be obtained by the user equipment through a Device-To-Device (D2D) communication. In this case, the source base station may send the second parameter to at least a given user equipment which can then transmit the second parameter to other UEs located in a proximity area based on the D2D communication for instance, provided that UEs of the network are D2D-enabled devices.

The method may further comprise receiving a value corresponding to the second parameter and being received from the source base station through the source cell or via another user equipment using direct communication.

In an embodiment of the invention, the second parameter relates to a desynchronization offset between the source base station and the target base station.

The second parameter determined by the source base station is specific to a couple of base stations formed by the source base station and the target base station since it relates to a level of synchronization between the source base station and the target base station. A couple of base stations thus refers here to a pair of base stations. More precisely, it relates to a time offset in the synchronization of the two base stations, such time offset corresponding to a time drift if the source base station and the target base station are synchronous, or a phase difference for a same considered subframe if the source base station and the target base station are asynchronous. Therefore, a desynchronization offset between the source base station and the target base station refers to a time-related value, such desynchronization offset relating to a level of synchronization between the source base station and the target base station.

In addition, if the network reference point for the source cell is different from the reference point for the target cell, the second parameter may also integrate the difference between the time propagation between the source base station and the reference point (of the source cell) and the target base station and the reference point (of the target cell).

The second parameter is not specific to a given user equipment. All user equipment having the same source cell and the same target cell will have the same value of the second parameter.

In an embodiment of the invention, the method further comprises sending the value to be used as a timing advance in the target cell to the source base station.

The user equipment informs the network of the value to be used as a timing advance in the target cell, thus sparing the network (and particularly the target base station) to compute the timing advance in the target cell. Therefore, it avoids consuming more radio resources by allocating a wide range of radio resources for the user equipment to access the target cell. By sending the value to be used as a timing advance to the source base station, it may enable the user equipment to skip messages from the RACH procedure in order to access the target cell and potentially from skipping the overall RACH procedure.

Thus, the value to be used as a timing advance in the target cell is sent by the user equipment before the user equipment actually performs a handover to the target base station, or more particularly before the user equipment sends a first message to the target cell using the value to be used as a timing advance.

Alternatively, the user equipment does not send the value to be used as a timing advance in the target cell and the network is configured to identify the UEs that determine their own value to be used as a timing advance from UEs performing the existing access procedure (wherein the timing advance to be used in the target cell is estimated by the target base station), based for example on the UEs to which a value corresponding to the second parameter has been sent by the source base station.

In an embodiment of the invention, the user equipment sends the value to be used as a timing advance in the target cell if the gap between the timing advance in the source cell and the value to be used as a timing advance in the target cell is above a threshold.

Therefore, the user equipment is prevented from consuming resources (radio resources, energy) to send a supplementary signal to the network in order to inform its value to be used as a timing advance in the target cell if said value is considered to be near the timing advance in the source cell, said timing advance used in the source cell being known by the user equipment and the source base station.

The network may consider, without receiving the value to be used as a timing advance in the target cell from the user equipment, that the value to be used as a timing advance in the target cell is the same as the last updated timing advance in the source cell.

By gap between the timing advance in the source cell and the value to be used as a timing advance in the target cell, it is understood an absolute difference of time between the last updated value of the timing advance in the source cell and the value to be used as a timing advance in the target cell as determined by the user equipment.

By a threshold, it is understood a predetermined value corresponding to a difference of time acceptable between the value to be used as a timing advance in the target cell and the last updated value of the timing advance in the source cell, such threshold being predetermined by the network. Such threshold can be sent to the user equipment before the user equipment sends a first signal to the target base station, by the source base station or any other base station the user equipment has been connected to before the source base station. Such threshold can be fixed or may vary depending on the characteristics of the change of coverage encountered by the user equipment or on characteristics of each satellite and/or base station for example.

For example, after determining the value to be used as a timing advance in the target cell and before sending said value to the source base station as well as before sending a first signal to the target base station, the user equipment determines the gap between the value to be used as a timing advance in the target cell and the last updated value of the timing advance in the source cell. Such gap may be compared by the user equipment to the threshold received from the network. If the gap is superior to the threshold, the user equipment sends the value to be used as a timing advance in the target cell as determined to the source base station in order to inform the network. If the gap is below the threshold, the user equipment does not send the value to be used as a timing advance in the target cell to the network. In such case, the user equipment may use the value to be used as a timing advance in the target cell as determined and the network may use the last updated timing advance in the source cell as the value to be used as a timing advance in the target cell.

In an embodiment of the invention, the method further comprises receiving from the source base station an estimated value of a timing advance in the source cell to be used as the data related to a timing advance in the source cell.

The user equipment is able to use the estimated value of a timing advance in the source cell received from the source base station to determine the value to be used as a timing advance in the target cell, such estimated value of the timing advance in the source cell being potentially in relation to the time interval or to a handover time to the target cell of the user equipment.

The data related to a timing advance in the source cell can be estimated by the source base station at a time close to the moment the user will have to determine the value to be used as a timing advance in the target cell, such value to be used as a timing advance in the target cell being all the more accurate that the different parameters including the data related to a timing advance in the source cell, the first parameter and the second parameter are based on values obtained within the time interval.

By an estimated value of a timing advance in the source cell, it is understood a last updated timing advance in the source cell estimated by the source base station for a later time. Since the timing advance in a cell evolves throughout time, the source base station continuously measures an updated timing advance of the user equipment in the source cell for example each time the user equipment sends an uplink transmission to the source base station (that is, while the user equipment is connected to the source base station and sends uplink transmissions through the source cell). Upon receiving an updated timing advance in the source cell, the user equipment adjusts the time delay of its uplink transmission to correspond to the updated timing advance in the source cell. The estimated value of a timing advance in the source cell can correspond to such an updated timing advance in the source cell based on the last uplink transmission sent by the user equipment. The estimated value of a timing advance in the source cell can also correspond to a value estimated for a moment further in time for which no uplink transmission has been sent by the user equipment yet. Such estimated value of a timing advance in the source cell can for example apply for a time belonging to the time interval predetermined by the network and/or the time when the user equipment has to perform a handover to the target cell. Such estimated value of a timing advance in the source cell can thus be based on previously updated timing advances in the source cell so as to identify a variation function of the timing advance in the source cell. The estimated value of a timing advance in the source cell may be not used by the user equipment for actual communication with the source base station.

In an embodiment of the invention, the method further comprises receiving from the source base station:

- a data related to a delay during which the user equipment does not send signals to the target base station; and/or
- a data related to a maximum time before which the user equipment has to send a signal to the target cell.

Therefore, the user equipment receives different time-related information which enables the user equipment to identify when to initiate a handover procedure to access the target base station using the value to be used as a timing advance in the target cell as determined. Such time-related information enables the network to guarantee the remaining connectivity of the user equipment to the network while optimizing the transmission flow within the network so as to avoid congestion, interference as well as failed access procedures due to collisions between different UEs attempting to access the same target cell within a same time slot.

By a delay during which the user equipment does not send signals to the target base station, it is understood a time duration during which the user equipment is located in the coverage zone of the target cell and does not send signals to the target base station. Such delay thus refers to a service pause timer to be applied by the user equipment before initiating the handover procedure to access to the target base station (that is, before the user equipment sends a first signal to the target base station). A data related to such delay can correspond to the actual time duration of the delay, such time duration beginning when the user equipment starts to be under the coverage of the target cell (which is known by the user equipment when it occurs, based on a measure of Reference Signal Received Power or RSRP above a RSRP threshold for instance). The data related to such delay can also correspond to a starting time and an end time of the delay for example.

Such delay gives time for instance to the other user equipments which intend to perform a handover procedure to the target cell but which have not determined their own value to be used as a timing advance in the target cell (through the disclosed method for instance) to actually obtain their timing advance in the target cell using existing methods without interfering with the access procedure of the user equipment. The delay can thus also act as a time trigger for a UE group access to the target cell, such group including UEs which have determined their value to be used as a timing advance in the target cell through the disclosed method or through existing methods.

By a maximum time before which the user equipment has to perform a handover to the target cell, it is understood a time-related value indicating when the user equipment has to initiate a handover procedure to access the target base station in order to pursue communication with the satellite communication network, so that transmissions between the user equipment and the satellite communication network are not disrupted. A data related to such maximum time can correspond to an actual maximum time duration the user equipment has before having to perform a handover to the target cell, such time duration beginning at the time of arrival at the user equipment of the message providing such maximum time from the source base station. Alternatively, the data related to the maximum time can correspond to a handover time (that is, an absolute time indicating when the user equipment has to perform a handover to the target cell), the user equipment thus using its clock to deduce the maximum time from the handover time.

Such data is predictable by the network based on the satellite constellation dynamic and the predefined successive changes of coverage on all geographic areas on the Earth surface covered by satellites of the satellite communication network.

A second aspect of the invention concerns a user equipment configured to determine a value to be used as a timing advance in a target cell in a network comprising a satellite communication network, the user equipment being connected to a source base station corresponding to a source cell, the target cell corresponding to a target base station, the source cell and the target cell being supported by one or more satellites of the satellite communication network, at least the source cell being supported by a non-geostationary orbit satellite of the satellite communication network, the user equipment comprising:

- a processor, and
- a non-transitory computer-readable medium comprising instructions stored thereon, which, when executed by the processor, configure the user equipment to determine a value to be used as a timing advance in the target cell before connecting to the target base station based on:
  - a data related to a timing advance in the source cell,
  - a first parameter, said first parameter being determined by the user equipment, and
  - a second parameter, said second parameter being specific to a couple of cells formed by the source cell and the target cell.

A third aspect of the invention concerns a method implemented by a network to perform a handover of a user equipment from a source cell to a target cell, the network comprising a satellite communication network, the source cell corresponding to a source base station and the target cell corresponding to a target base station, at least the source cell being supported by a non-geostationary orbit satellite of the satellite communication network, the method comprising:

- determining a parameter, said parameter being related to a value specific to a couple of cells formed by the source cell and the target cell,
- sending said parameter to at least a user equipment,
- performing the handover of the user equipment from the source cell to the target cell;

wherein a value to be used as a timing advance in the target cell by the user equipment is dependent on said parameter and a timing advance in the source cell of the user equipment.

Therefore, based on the parameter received and the timing advance in the source cell of the user equipment, a user equipment is potentially able to determine the value to be used as a timing advance in a target cell.

By providing a user equipment with the parameter the user equipment may determine a value to be used as a timing advance in the target cell, the network therefore reduces the amount of signaling, computing and radio resources required to perform a handover procedure of a user equipment since such value to be used as a timing advance in the target cell is potentially not required to be determined by the network (and more precisely by the target base station, that is the base station the user equipment connects to after the handover) in order to perform the handover (as previously described).

For example, the invention enables to reduce the computing and signaling during the handover which for example in the context of most wireless standard (for example, LTE, Advanced LTE or New Radio) may enable to remove one message during the handover procedure (for example the RACH preamble or the second message (Msg2) sent by the target base station during the RACH procedure, and/or in some cases skip the RACH procedure altogether). Removing those messages enables to reduce the handover latency. In addition, removing those messages (or at least applying a timing advance offset while sending those messages) also enables to release important amount of radio resources, since the exchanges performed between the target base station and the user equipment during the handover procedure when the user equipment (and eventually the target base station) does not yet implement a time offset based on the timing advance value (to compensate the time required for the signal to propagate) require the target base station to reserve much more radio resources than a classical exchange. Indeed, the target base station cannot (or only poorly) predict the time of reception of these exchanges, therefore to avoid interferences with other transmissions (and thus to reduce the number of unsuccessful access procedures) the target base station must reserve important radio resources to take into account possible delays due to signal propagation. Therefore, by sending a parameter to the user equipment which enables the user equipment to determine its own value to be used as a timing advance in the target cell, the network potentially spare the target base station from consuming radio resources.

By determining a parameter specific to a couple of cells formed by the source cell and the target cell, it is understood that the network determines a parameter as a function of both the source cell and the target cell. By a couple of cells, it is understood a pair of cells.

The source base station can also rely on intersatellite links (ISL) and/or communicate with another network entity such as the target base station and/or communicate with user equipments to determine the parameter. A network entity may refer to a base station or a satellite.

The parameter varies as a function of the couple of cells.

The parameter is sent to the user equipment by the network, for example by the source base station through the source cell, or through a cell to which the user equipment has been previously connected to before being connected to the source cell. Such transmission can then correspond to a broadcast, multicast or groupcast transmission, so that several UEs covered by the source cell corresponding to the source base station receive the value of the parameter. The parameter may also be sent to the user equipment by another user equipment using D2D communication.

The parameter being a function of the couple of cells, UEs covered by the source base station and having the same target base station will have the same value of the parameter. Groupcast or multicast transmissions of the parameter by the source base station can be based on criteria regarding the geographic location or the measured received power of UEs for example.

By performing the handover of the user equipment from the source cell to the target cell, it is understood that radio resources are allocated by the target base station of the network so as to enable an uplink transmission between the user equipment and the target station in order to initiate a handover procedure of the user equipment to access the target base station. Such user equipment is connected to a source base station and is allocated radio resources from such source base station in order to exchange downlink and uplink transmissions between the source base station and the target base station while the user equipment is still connected to the source base station.

By a value to be used as a timing advance in the target cell by the user equipment, it is understood a time-related value obtained by the user equipment in order for the user equipment to advance the time of its uplink transmission through the target cell by an amount of time corresponding to that value. Such value is potentially determinable by the user equipment using the parameter received from the network and the timing advance of the user equipment in the source cell.

The value to be used as a timing advance in the target cell is determinable by the user equipment at a time before the target base station receives signals from the user equipment. Before the target base station receives signals from the user equipment is understood here as a time prior to the moment the user equipment initiates a first uplink transmission towards the target base station to perform a handover procedure to access the target cell. That is, the value to be used as a timing advance in the target cell is determinable by the user equipment without requiring the target base station to either identify the user equipment, or to proceed to a RACH procedure or more generally to receive a first signal from the user equipment so as to estimate the value to be used as a timing advance in the target cell.

The value to be used as a timing advance in the target cell can for example be applied in the first uplink transmission or message received by the target base station from the user equipment which initiates an access procedure to the target base station (which can correspond to the existing RACH procedure, a modified RACH procedure or a different access procedure).

The value to be used as a timing advance in the target cell being dependent on said parameter and a timing advance in the source cell of the user equipment refers to the fact that the value is a function of at least the parameter and the timing advance. Therefore, by knowing both the parameter determined by the network and the timing advance of the user equipment in the source cell, it is possible to determine the value to be used as a timing advance in the target cell. Being dependent is understood here as the fact that the values of a timing advance in the source cell of the user equipment and of the parameter may be explicitly used to compute the value to be used as a timing advance in the target cell.

In an embodiment of the invention, the value to be used as the timing advance in the target cell by the user equipment is not determined by the target base station.

Therefore, in order to perform a handover of a user equipment from a source cell to a target cell, it is no longer necessary that the target base station estimates the timing advance to be used in the target cell and sends it to the user equipment during the handover (for instance in a message Msg2 after having received a first uplink transmission from the user equipment) or to any other network entity (such as the source base station) to transmit it to the user equipment. Therefore, less signaling and less computing are required during the handover.

By the value to be used as the timing advance in the target cell by the user equipment is not determined by the target base station, it is understood that the target base station does not launch any measurement or estimation in order to determine a timing advance of the user equipment in the target cell at the intention of the user equipment, contrarily to existing handover procedures. In an embodiment, the target base station does not receive signals such as an uplink transmission from the user equipment, based on which the target base station may estimate the value to be used as a timing advance of the user equipment in the target cell.

As a consequence, when performing a handover of the user equipment from the source cell to the target cell using the value to be used as a timing advance in the target cell of the user equipment, it is understood that such value to be used as a timing advance in the target cell has been determined before initiating the first uplink transmission between the user equipment and the target base station in order to start the handover procedure to the target cell. Such value to be used as a timing advance in the target cell is thus potentially determined on the user equipment side. Yet, the target base station may still obtain the value to be used as a timing advance in the target cell before receiving the actual first uplink transmission from the user equipment, for example if the user equipment sends such value to the source base station which transmits it to the target base station using ISL for instance. The value to be used as a timing advance in the target cell can be received by the network from the user equipment before the handover of the user equipment, so that the target base station does not need to allocate a large amount of radio resources to launch the handover procedure of the user equipment (a large amount being understood here as an amount of radio resources classically allocated to user equipment in existing handover procedures, when no timing advance in the target cell is determined beforehand by the user equipment).

In an embodiment of the invention, the parameter is a desynchronization offset between the source base station and the target base station.

In an embodiment of the invention, the parameter is determined based on at least:

- a data related to timing advance of a second user equipment in the target cell, and
- a timing advance in the source cell of the second user equipment.

Therefore, with the knowledge, on the one hand, of a timing advance in the source cell of a second user equipment, and on the other hand, of a data related to timing advance of the second user equipment in the target cell, it is possible to determine a time shift of timing advance to be applied by the second user equipment when it switches connection from the source cell to the target cell. This time shift of timing advance gives at least relevant information about the timing advance of the user equipment in the target cell. This time shift can even be common to the second user equipment and the user equipment, for example in the case of a gateway switch, since all UEs covered by the satellite undergoing the gateway have the same time shift of timing advance or if the second user equipment and the user equipment are geographically close. It is possible to determine or at least to approximate the value to be used as a timing advance in the target cell based on the timing advance of the user equipment in the source cell and such value of time shift, therefore reducing the timing advance error between the approximate value and the value that would be determined by the target base station.

By second user equipment, it is understood a user equipment which is or was connected to the source base station and will or has performed a handover between the source cell and the target cell (the second user equipment has the same target cell than the user equipment). Such handover can be performed according to a method of the present disclosure or according to any existing method. The second user equipment may be selected by the source base station according to similarities with the user equipment (same target base station, close to the user equipment . . . ). As a consequence, the user equipment and the second user equipment as selected by the source base station share the same value of the parameter, since it is a value specific to a couple of cells formed by the source cell and the target cell, or at least share a proximate value of the parameter, since the estimation of the parameter can differ from one user equipment to another.

The second user equipment is different from the user equipment for which the network performs a handover from the source cell to the target cell using the value to be used as a timing advance in the target cell of the user equipment as previously described.

The data related to timing advance of a second user equipment in the target cell may be determined according to a method of the present disclosure or measured according to any existing method.

The data related to timing advance of a second user equipment in the target cell may correspond to the timing advance of the second user equipment in the target cell or to the timing error measured by the target base station based on the testing timing advance used in the target cell by the second user equipment for instance.

Several second user equipments can be selected by the network to obtain data related to timing advance of these second user equipments in the target cell. The source base station may determine the parameter as an average of the estimated parameter based on each second user equipment or an average between the time shifts of each timing advance determined for each second user equipment. Each second user equipment may be selected by the source base station according to similarities with the user equipment (same target base station, close to the user equipment . . . ).

In an embodiment of the invention, the method further comprises:

- receiving a value from the second user equipment, said value being dependent on times of arrival at the second user equipment of:
  - a first signal received from the source base station, through the source cell, and
  - a second signal received from the target base station, through the target cell, wherein the parameter is determined based on said value.

Therefore, the parameter can also be determined based on a value specific to the second user equipment, such value relating to a time difference between times of arrival as measured and/or estimated by the second user equipment. Therefore, the estimation of the parameter is less dependent to the position of the second user equipment, and its estimation is more accurate. The process of obtaining such value is for example similar as the process of the user equipment to obtain a first parameter based on times of arrival according to the first main embodiment of the present disclosure.

The parameter can be determined by the source base station upon receiving the value from the second user equipment.

A time of arrival at the second user equipment of a signal refers here to the time when the signal is received by the second user equipment, such time thus being considered from the perspective of the second user equipment.

In such embodiment of the invention, the method further comprises selecting the second user equipment such as the value received from the second user equipment is below a threshold.

The second user equipment can be selected by the network so as to simplify the determination of the parameter as much as possible, therefore, reducing the computing to determine the parameter and eventually the resources required to transmit such value. In this case, the second user equipment is selected by the source base station in order to determine the parameter to be sent to the user equipment when the value sent by the second user equipment can be considered negligible. Thus, the determination of the parameter does not rely on the value of such selected second user equipment anymore since it has been ensured that such value is below the threshold and thus considered null or fixed to a small value by the source base station.

The threshold may be predefined by the source base station. If the value sent by the second user equipment is above the threshold, the source base station does not take the measures and data of that second user equipment into account in the determination of the parameter to be sent to the user equipment. Alternatively, only second user equipments with a value under the threshold report their value to the source base station, therefore reducing the consuming of radio resources.

In an embodiment of the invention, the method further comprises:

- sending an instruction to the user equipment when the source cell and the target cell are supported by the same satellite, said instruction instructing the user equipment to determine the value to be used as a timing advance in the target cell only based on:
- the timing advance in the source cell of the user equipment and the parameter, or
- the timing advance in the source cell of the user equipment, the parameter and a predefined fixed value.

Therefore, in the scenario where the source cell and the target cell are supported by the same satellite, the determination of the value to be used as a timing advance in the target cell can be simplified.

The instruction may also contain a predefined fixed value or information enabling the user equipment to deduce said predefined fixed value, the value to be used as a timing advance in the target cell by the user equipment being determined based on such predefined fixed value.

For example, in the case of a change of coverage due to a gateway switch, the source base station can send to the user equipment:

- the parameter corresponding to a time shift of timing advances between the source cell and the target, such parameter being determined using the second user equipment;
- an update of a data related to a timing advance in the source cell of the user equipment;
- an instruction to apply such parameter as a time shift to the last updated timing advance in the source cell in order to determine the value to be used as a timing advance in the target cell.

In an embodiment of the invention, the method further comprises selecting the second user equipment such as the gap between a timing advance of the second user equipment in the target cell and a timing advance of the second user equipment in the source cell is below a threshold.

Therefore, the second user equipment can be selected by the network so as to simplify the determination of the parameter as much as possible. In this case, the second user equipment is selected by the source base station in order to determine the parameter to be sent to the user equipment if the time shift between timing advances in the source cell and the target cell of the second user equipment can be considered negligible. Thus, the determination of the parameter only relies on the value sent by the second user equipment.

By a gap, it is referred to a time difference between the timing advance in the source cell of the second user equipment and the timing advance in the target cell of the second user equipment as previously described.

If the gap between the timing advance in the target cell of the second user equipment (either received from the second user equipment or deduced using the timing error reported by the target base station) and the timing advance of the second user equipment in the source cell is above the threshold, the source base station does not take the measures and data of that second user equipment into account in the determination of the parameter to be sent to the user equipment.

In an embodiment of the invention, the method further comprises selecting the second user equipment based on whether or not the second user equipment is in a geographic zone.

Therefore, the source base station can also select the second user equipment whose data and measures will be used to determine the parameter to be sent to the user equipment based on a geographic criterion. Such geographic criterion enables to ensure that the selected second user equipment lies in a geographical location particularly favorable for conducting such measurement, so that the parameter determined using the second user equipment can be relevantly sent to the user equipment for its determination of the value to be used as a timing advance in the target cell by the user equipment.

By a geographic zone, it is understood a part of the Earth surface which is defined or predefined by the network. Since the changes of coverage on the Earth surface depends on the satellite constellation dynamic as well as the beam topology, the network and potentially the source base station, is able to predict which part of the Earth surface will be covered by which downstream cell next to the serving cell covering such part of the Earth surface. In the case of the source cell, one or several downstream cells can replace the source cell, potentially leading to UEs all currently connected to the same source base station, but which will be covered by different downstream cells, depending on the location of each user equipment within the source cell. As a consequence, a network entity such as the source base station is able to define a geographic zone which includes the location of the user equipment and corresponding to the coverage area of a downstream cell (which is thus the target cell of the user equipment). All the other UEs belonging to such geographic zone are thus potential second user equipments selectable by the source base station in order to determine the parameter. In such case, the second user equipment is directly identified by the source base station by receiving a groupcast transmission emitted by the source base station specifically within the geographic zone. The source base station can also send the relevant geographic zone considered by the source base station and second user equipment which are able to locate themselves using a GNSS system identify themselves to be in such geographic zone or not and report consequently to the source base station.

The source base station may define the geographic zone based on other criteria than the location of the potential second user equipment, such as a level of transmission power received by the potential second user equipment from the target cell.

In an embodiment of the invention, the method further comprises sending from the source base station to the user equipment a message comprising:

- a data related to a timing advance of the user equipment in the source cell; and/or
- a data related to a time interval; and/or
- an indicative value; and/or
- a data related to a delay during which the user equipment does not send signals to the target base station; and/or
- a maximum time before which the user equipment has to perform the handover to the target cell.

In such embodiment of the invention, the message is multicasted to a group of user equipments within the source cell or broadcasted via the source cell, said group of user equipments being determined based on:

- a distance of the user equipments of the group from a beam center of the source cell, or
- a level of Reference Signal Received Power of the user equipments of the group, or
- a geographic zone.

Therefore, the source base station can save radio resources by sending multicast, groupcast or broadcast messages to several UEs depending on the nature of the information contained by such message, instead of sending one specific handover command to each user equipment for example.

By multicasted to a group of user equipments within the source cell, it is understood that the message sent by the source base station comprises at least one signal which is sent to a group of UEs formed for example by the second user equipments and/or the user equipment. The determination of such group can be based on a geographic criterion, such as a distance of the user equipments of the group from a beam center of the source cell or the user equipments of the group belonging to the geographic zone for example. The determination of such group can also be based on a level of transmission power received by the user equipments of the group from the target cell, such transmission power relating for example to a Reference Signal Received Power (RSRP) or a Signal to Noise Ratio (SNR) or any other level of transmission power reflecting the quality of the signal received from the target cell. Thus, the user equipments which perceive a level of transmission power above a predefined threshold are considered by the source base station to be able to access the target base station and are thus part of the group of UEs receiving the groupcast message sent by the source base station.

By broadcasted via the source cell, it is understood that the message sent by the source base station comprises at least one signal which is sent to all UEs covered by the source cell. Such broadcasted message is thus not specifically intended to the user equipment as the information it contains is common to all UEs under the coverage of the source cell. Such broadcast message can for instance correspond to a signal containing the parameter in the case when the whole coverage area of the source cell is replaced by the coverage area of only one target cell on the Earth surface (that is, all UEs currently covered by the source cell will be covered by the same target cell and thus share a same value of the parameter).

A fourth aspect of the invention concerns a network configured to perform a handover of a user equipment from a source cell to a target cell, said network comprising a satellite communication network, said network comprising a source base station and a target base station, the source cell corresponding to the source base station and the target cell corresponding to the target base station, at least the source cell being supported by a non-geostationary orbit satellite of the satellite communication network, the network being configured to:

- determine a parameter, said parameter being related to a value specific to a couple of cells formed by the source cell and the target cell,
- send said parameter to at least the user equipment,
- perform the handover of the user equipment from the source cell to the target cell;

wherein a value to be used as a timing advance in the target cell by the user equipment is dependent on said parameter and a timing advance in the source cell of the user equipment.

The network may comprise a network entity which comprises a processor and a non-transitory computer-readable medium comprising instructions stored thereon, which when executed by the processor, configure the network entity to determine the parameter and instruct the source base station to send the parameter to the user equipment.

A fifth aspect of the invention concerns a computer program product comprising program instruction code stored on a computer-readable medium for the execution of:

- the method according to the first aspect of the invention, and/or
- the method according to the third aspect of the invention.

A sixth aspect of the invention concerns a method implemented by a system to determine a value to be used as a timing advance by a user equipment in a target cell in a network comprising a satellite communication network, said system comprising at least:

- the user equipment, said user equipment being connected to a source base station corresponding to a source cell, the target cell corresponding to a target base station, the source cell and the target cell being supported by one or more satellites of the satellite communication network, at least the source cell being supported by a non-geostationary orbit satellite of the satellite communication network, and
- the network, said method comprising:

- determining a second parameter, said second parameter being related to a value specific to a couple of cells formed by the source cell and the target cell,
- sending by the network said second parameter to at least the user equipment,
- determining a first parameter, determining by the user equipment the value to be used as a timing advance by the user equipment in the target cell, before the user equipment transmits a first signal to the target base station, based on:

a data related to a timing advance in the source cell, the first parameter, and the second parameter.

A seventh aspect of the invention concerns a system configured to determine a value to be used as a timing advance in a target cell in a network comprising a satellite communication network, said system comprising at least:

a user equipment according to the second aspect of the invention, and a network according to the fourth aspect of the invention.

Other features, details and advantages will be shown in the following detailed description and on the figures, not in a limitative way.

DESCRIPTION OF EMBODIMENTS

Figure 1:
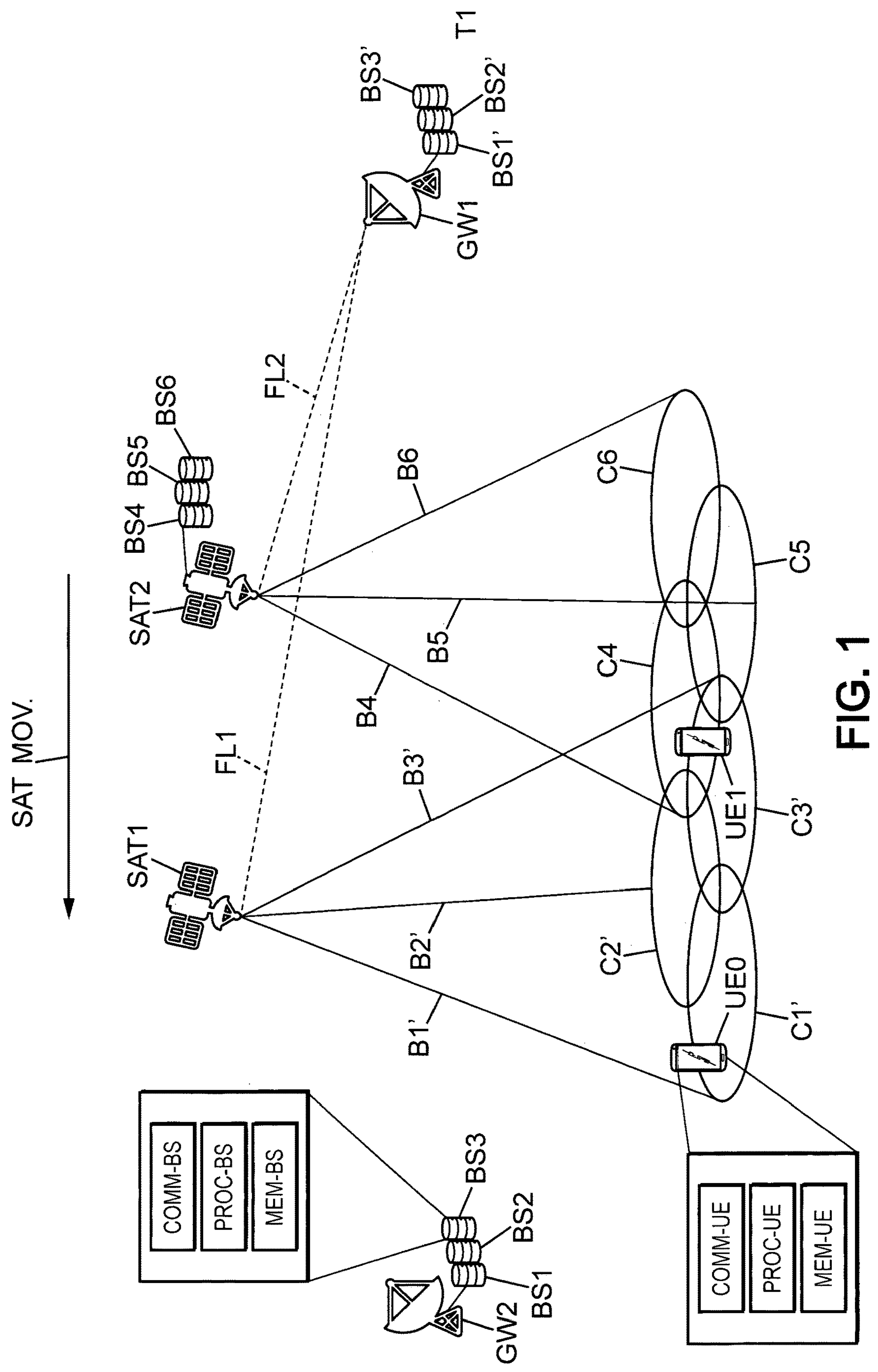
FIG. 1 represents a part of a satellite communication network according to an embodiment of the present invention.
Figure 2:
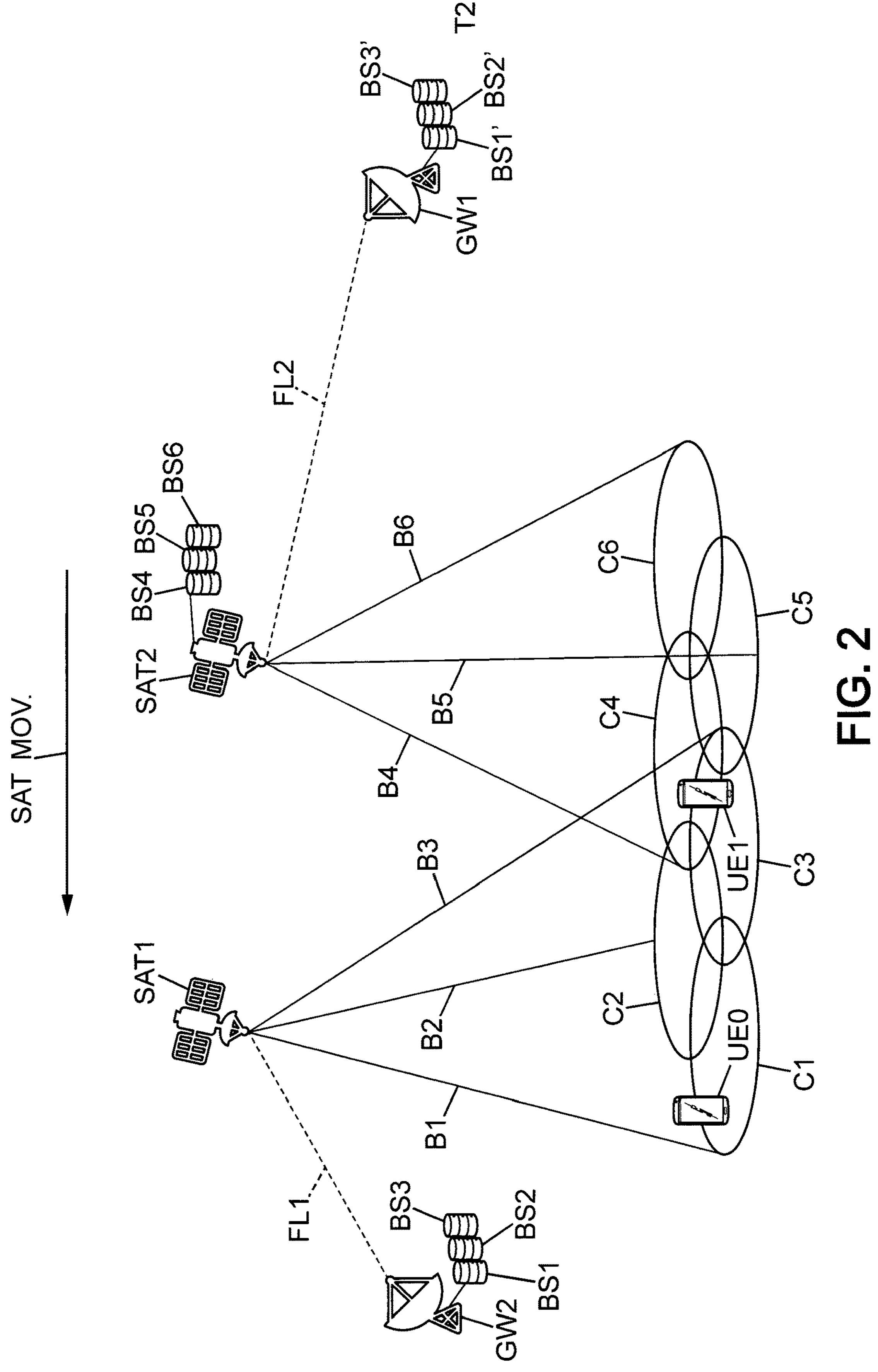
FIG. 2 represents a part of a satellite communication network according to an embodiment of the present invention.
Figure 3:
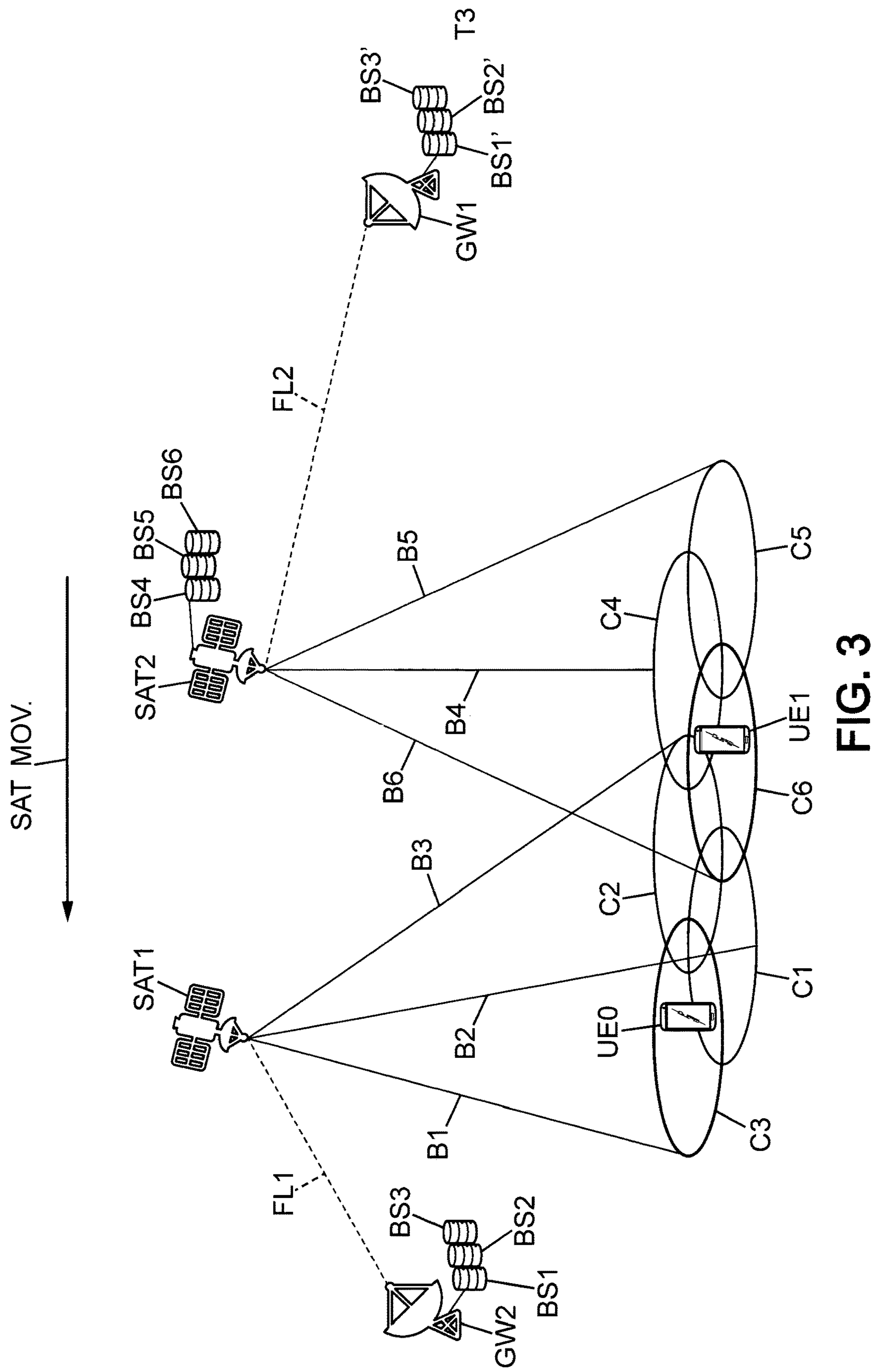
FIG. 3 represents a part of a satellite communication network according to an embodiment of the present invention.

It is now referred to FIGS. 1 to 3. FIGS. 1 to 3 represent a same part of a satellite communication network. The invention is not limited to any specific standard, however, for the sake of simplicity, the invention will be described in the context of the New Radio (NR) standard.

FIGS. 1 to 3 show a satellite communication network comprising two different satellites SAT1, SAT2, two different gateways GW1, GW2, nine different base stations BS1' to BS3' and BS1 to BS6 and two different user equipment UE0, UE1.

FIG. 1 shows the part of the satellite communication network at a time T1. FIG. 2 shows the same part of the satellite communication network at a time T2 later than time T1. FIG. 3 shows the same part of the satellite communication network at a time T3 later than time T2.

Satellites SAT1, SAT2 are considered to be deployed in a Low-Earth Orbit (LEO) context and thus have an altitude approximately between 300 and 1500 kilometers with respect the Earth surface. The user equipment UE0, UE1 are considered to be at the Earth surface. Each satellite SAT1, SAT2 is linked to at least one gateway GW1, GW2, also referred to as a gateway node or ground station. In FIG. 1 at time T1, both satellites SAT1 and SAT2 are linked to gateway GW1 through feeder links FL1 and FL2 respectively. Such gateway GW1 communicates with satellites SAT1, SAT2 on the one hand and with the core network (which is not represented here) on the other hand. In FIGS. 2 and 3 corresponding to times T2 and T3 respectively, satellite SAT1 is linked to gateway GW2 through feeder link FL1 and satellite SAT2 is still linked to gateway GW1 through feeder link FL2.

Each satellite SAT1, SAT2 deploys one or several satellite beams B1' to B3', B1 to B6. On FIG. 1, satellite SAT1 deploys three satellite beams B1' to B3' and satellite SAT2 deploys three beams B4 to B6. On FIGS. 2 and 3, satellite SAT1 deploys three satellite beams B1 to B3 while satellite SAT2 still deploys the same satellite beams B4 to B6. Each satellite beam B1' to B3' B1 to B6 is configured in a specific frequency band. Through each satellite beam B1' to B3', B1 to B6, the corresponding satellite (that is, the satellite which deploys the beam) may transmit and receive data according to radio resources allocated in the frequency band configured for the beam. These radio resources may be shared according to a frequency division scheme (for example, Frequency Division multiplexing (FDM) or Orthogonal frequency-division multiplexing (OFDM)) or by a time division scheme (for example, Time-division multiplexing (TDM)) or code division scheme (code division multiplexing (CDM)), polarization multiplexing, or a combination thereof.

The allocation of the radio resources of satellite beam B1' to B3', B1 to B6 is achieved by the base stations BS1' to BS3', BS1 to BS6, also referred to as gNodeB or gNB. Each base station BS1' to BS3', BS1 to BS6 manages the radio resources of one or several satellite beams. For example, and as represented on FIGS. 1 to 3:

at time T1, base stations BS1' to BS3' manage the radio resources deployed by satellite beams B1' to B3' respectively, at times T2 and T3, base stations BS1 to BS3 manage the radio resources deployed by satellite beams B1 to B3 respectively, from times T1 to T3, base stations BS4 to BS6 manage the radio resources deployed by satellite beams B4 to B6 respectively.

On FIGS. 1 to 3, a base station is represented to manage the radio resources of one satellite beam. Each base station may as well manage the radio resources deployed by several satellite beams.

Base stations may be located onboard a satellite SAT1, SAT2 or on the Earth surface, for example by the gateways GW1, GW2. Referring to FIGS. 1 to 3 as an example, base stations BS1' to BS3' are located on the Earth surface by the gateway GW1, base stations BS1 to BS3 are located on the Earth surface by the gateway GW2. Base stations BS4 to BS6 are co-located onboard satellite SAT2. The term co-localized refers here to two network entities being located at a same geographic position. A network entity can refer to a base station BS1' to BS3' or BS1 to BS6, a gateway GW1, GW2, a satellite SAT1, SAT2 or any other entity of the core network. It does not usually refer to a user equipment UE0, UE1.

Via its satellite beams B1' to B3', B1 to B6, each satellite SAT1, SAT2 projects a footprint on the Earth surface, also referred to as a service area or a coverage zone of the satellite SAT1, SAT2. A satellite's footprint deploys one or several cells C1' to C3', C1 to C6. Each cell C1' to C3', C1 to C6 serves the UEs lying in the footprint of one or several satellite beams B1' to B3', B1 to B6 and corresponds, in particular, to only one base station BS1' to BS3', BS1 to BS6. In other words, each base station BS1' to BS3', BS1 to BS6 defines one cell C1' to C3', C1 to C6 on the Earth surface. Thus, depending on its location on the Earth surface, a user equipment UE0, UE1 is located in the coverage zone of one or several cells C1' to C3', C1 to C6 and can thus be allocated radio resources by one of the corresponding base stations BS1' to BS3', BS1 to BS6 through the corresponding satellite beams managed by such base station BS1' to BS3', BS1 to BS6, providing that the user equipment UE0, UE1 is connected to such base station BS1' to BS3', BS1 to BS6.

Referring to FIG. 1 at time T1 for example, the user equipment UE0 is in cell C1' managed by base station BS1' of satellite SAT1. The user equipment UE0 may thus receive radio resources allocated by the base station BS1' through satellite beam B1'. The user equipment UE1 is in cell C3' managed by base station BS3' of satellite SAT1. The user equipment UE1 may thus receive radio resources allocated by the base station BS3' through satellite beam B3'.

Each base station BS1' to BS3', BS1 to BS6 comprises at least a processing module PROC-BS, a memory unit MEM-BS and a communication module COMM-BS. The communication module COMM-BS enables the base station BS1' to BS3', BS1 to BS6 to receive and/or emit signals from/to user equipment UE0, UE1 and any network entity. Through the communication module COMM-BS, a base station BS1' to BS3', BS1 to BS6 is able to receive and transmit information with the core network.

A user equipment UE0, UE1 comprises at least a processing module PROC-UE, a memory unit MEM-UE and a communication module COMM-UE. Such communication module COMM-UE enables the user equipment UE0, UE1 to receive and/or emit signals from/to another user equipment directly (which is referred to as direct communication) and one or several base stations BS1' to BS3', BS1 to BS6 of the satellite communication network.

In order to be allocated radio resources by a base station BS1' to BS3', BS1 to BS6, a user equipment UE0, UE1 must at least receive sufficient radio power from at least one satellite beam B1' to B3', B1 to B6 managed by that base station BS1' to BS3', BS1 to BS6. In other words, the user equipment UE0, UE1 must at least be located in the coverage zone of a cell C1' to C3', C1 to C6 in order to be allocated radio resources for communications with its corresponding base station BS1' to BS3', BS1 to BS6. The user equipment UE0, UE1 must moreover be connected to that base station BS1' to BS3', BS1 to BS6, either through an initial access or a handover access, in the case the user equipment UE0, UE1 was connected to another base station and accesses the base station BS1' to BS3', BS1 to BS6 through a handover procedure.

Referring to FIG. 1, at time T1 for example, the user equipment UE0, UE1 is considered to be connected to a base station (the initial access procedure is thus not discussed here), which is referred to as the source base station of the user equipment UE0, UE1. The fixed location of the user equipment UE0, UE1 is in the cell corresponding to the source base station which is referred to as the source cell of the user equipment UE0, UE1. At time T1, user equipment UE0 is connected to its source base station BS1' through its source cell C1' and user equipment UE1 is connected to its source base station BS3' through its source cell C3'.

In the context of the present description, satellites SAT1, SAT2 of the satellite communication network are considered to be non-geostationary orbit satellites. Satellites SAT1, SAT2 thus move with respect to the Earth surface following predefined ephemerides and according to predefined satellite constellation dynamic and network topology. Such ephemerides are for instance preconfigured within the core network. As a result, the movement and successive positions of satellites SAT1, SAT2 throughout time is known by the core network and by extension, is accessible to network entities such as satellites SAT1, SAT2 and particularly base stations BS1' to BS3', BS1 to BS6 using intersatellite link (ISL) communication for instance. The movement of satellites SAT1, SAT2 is represented on FIGS. 1 to 5 as an arrow SAT MOV indicating that satellites SAT1, SAT2 move from the right side to the left side in the part of the satellite communication network represented on FIGS. 1 to 5. The movement of UEs on the Earth surface being neglectable in comparison with the movement of satellites SAT1, SAT2, a user equipment UE0, UE1 is considered to have a fixed geographic location of the Earth surface.

In particular, the movement of satellites SAT1, SAT2 according to a predictable satellite constellation dynamic leads to the cells C1' to C3', C1 to C6 also changing on the Earth surface in a predictable way. As a consequence, considering a fixed geographic area on the Earth surface (for example, the geographic area containing user equipment UE0 and UE1 as represented on FIGS. 1 to 3), such fixed geographic area will be covered by a succession of different cells C1' to C3', C1 to C6 throughout time. The change of coverage, at a given time, between a current cell and a cell downstream to that current cell is referred to as a cell switch. The cell switch between two cells occurs with respect to a predefined timeline which may notably depend on the architecture of satellites and their satellite beams.

Indeed, satellites SAT1, SAT2 can be equipped with either fixed or steerable satellite beams B1' to B3', B1 to B6. In the case of fixed satellite beams B1' to B3', B1 to B6, satellite beams B1' to B3', B1 to B6 are unmoving with respect to the satellite SAT1, SAT2. Thus, the satellite's footprint and the cells C1' to C3', C1 to C6 move on the Earth surface in a progressive way. Such scenario is referred to as a fixed beam/moving footprint scenario. In the case of steerable (or movable) satellite beams B1' to B3', B1 to B6 with respect to the satellites SAT1, SAT2, satellite beams B1' to B3', B1 to B6 are steered as their respective satellites SAT1, SAT2 move following respective orbit trajectories, such beam steering being adjusted to the movement of satellites SAT1, SAT2 so that cells C1' to C3', C1 to C6 cover approximately the same geographic area on the Earth surface during a predetermined time. As a result, the cells C1' to C3', C1 to C6 (or at least a center part of the cells C1' to C3', C1 to C6) are considered immobile on the Earth surface for a predetermined time. Such time notably depends on the extent to which satellite beams B1' to B3', B1 to B6 can compensate the movement of satellites SAT1, SAT2 until a given elevation angle between the satellite beams B1' to B3', B1 to B6 and the Earth surface is reached for instance and above which the satellite beams B1' to B3', B1 to B6 are switched off and replaced by different satellite beams B1' to B3', B1 to B6. Such scenario is referred to as the steerable beam/fixed footprint scenario. For example, FIGS. 1 to 5 represent part of a satellite communication network wherein satellites SAT1, SAT2 have steerable satellite beams B1' to B3', B1 to B6.

As a consequence, a current cell covering a user equipment UE0, UE1 located in a fixed geographic area on the Earth surface at a given time will be replaced by one or several cells downstream to the current cell in a predictable time duration and according to predictable cell switch conditions.

Such cell switch conditions can depend on a more or less progressive nature of the cell switch between the current cell covering the geographic area and a cell downstream to the current cell. For example, the fixed beam/moving footprint scenario often leads to a more progressive cell switch in comparison with the steerable beam/fixed footprint scenario, wherein the cell switch is almost simultaneous when the beam steering corresponding to the current cell covering the fixed geographic area reaches a given extent and is switched off.

Such cell switch conditions can also depend on the fact that the downstream cell can be switched on the fixed geographic area before the current cell is switched off from that fixed geographic area. The two cells thus overlap during a predetermined overlapping time duration and the cell switch is in a soft cell switch scenario (that is, considering a fixed geographic area, when the downstream cell is switched on before the current cell is switched off). On the contrary, when the current cell is switched off from the fixed geographic area before the downstream cell is switched on the fixed geographic area. The cell switch is then in a hard cell switch scenario (that is, considering a fixed geographic area, when the downstream cell is switched on after the current cell is switched off).

Such cell switch conditions can also depend on a nature of the cell switch, which can refer to:

- an inter-satellite switch, when the current cell, which belongs to a satellite is replaced by a downstream cell from another satellite, or
- an intra-satellite switch, when a current cell, which belongs to a satellite is replaced by a downstream cell from the same satellite, or
- a gateway switch, when the satellite of the current cell switches its feeder link from a current gateway to another gateway and the current cell corresponding to a base station located on the current gateway leading to the current cell being replaced by a downstream cell with different connectivity properties.

As a consequence, when a fixed geographic area on the Earth surface encounters a change of coverage between the current cell covering the fixed geographic area and one or several downstream cells, the cell switch conditions within the fixed geographic area are changing in various ways depending on the nature, the speed as well as the hard or soft scenario of the cell switch. As a result, for user equipments (or UEs) which fixed locations on the Earth surface belong to the fixed geographic area, a change of coverage requires such UEs to perform handovers in order to maintain a connectivity to the satellite communication network. The various possible cell switch conditions in a fixed geographic area on the Earth surface lead to various possible scenarios of handovers for UEs.

Still, since the successive changes of coverage in the fixed geographic area result from a predictable satellite constellation dynamic, it is possible for the network—and more particularly for the current source base station corresponding to the current cell covering the fixed geographic area at the current time- to predict which downstream cells will replace the current cell and when and how such cell switch will occur. In particular, for each user equipment UE0, UE1 connected to the current base station, the current base station is able to identify, based for example on the location of each user equipment UE0, UE1 within the current cell, the downstream cell to which the user equipment UE0, UE1 has to connect to (for example by performing a handover) in order to pursue its communication through the satellite communication network, once the current cell corresponding to the current base station will be switched off. Such downstream cell to which the user equipment UE0, UE1 has to connect to in order to pursue its communication through the satellite communication network, once the current cell corresponding to the current base station will be switched off is referred to as a target cell of the user equipment UE0, UE1 and the base station corresponding to the target cell is referred to as the target base station of the user equipment UE, UE1.

In order to access its target base station, a user equipment UE0, UE1, which is currently connected to its source base station, will perform a handover procedure from the source base station to the target base station. Since a cell corresponds to a base station and vice versa, a handover between a source base station and a target base station, or a handover between a source cell and a target cell shall be used interchangeably. For the sake of simplicity, a cell will refer to a geographic area served by the base station while the base station refers to the network module containing hardware and software which is used to receive and emit signals with user equipment UE0, UE1 and other network entities.

In the context of a user equipment UE0, UE1 being initially connected to a source base station which will soon be replaced by a target base station, it is required for the user equipment UE0, UE1 to perform a handover from the source base station to the target base station in order to connect to the target base station and pursue its communication with the target base station. In particular, the reliability of such communication requires the acquisition of a timing advance to be used in the target base station by the user equipment UE0, UE1. Such timing advance to be used in the target base station refers to a specific time duration by which the user equipment UE0, UE1 has to advance its uplink transmission to the target base station, notably so as to avoid transmission interferences with other transmissions between the target base station and other UEs.

In existing procedures in NR standard, the acquisition of such timing advance to be used in the target base station by the user equipment UE0, UE1 occurs when the user equipment UE0, UE1 launches an access procedure to the target base station for example by performing a RACH procedure. Such RACH procedure notably consists in the user equipment UE0, UE1 sending an uplink transmission to the target base station, based on which the target base station is able to measure the timing advance to be used in the target cell by the user equipment UE0, UE1 and then send such timing advance to the user equipment UE0, UE1.

As a consequence, in existing procedures, the user equipment UE0, UE1 is not able to determine its timing advance in the target cell without exchanging messages with the target base station (for example, the first and second messages in the RACH procedure), such messages being time and resource consuming for both the network and the user equipment UE0, UE1.

The FIGS. 1 to 3 illustrate the same part of the satellite communication network which covers a fixed geographic region on the Earth surface, user equipment UE0 and user equipment UE1 being located in such represented fixed geographic region. Such fixed geographic region encounters successive changes of coverage between times T1, T2 and T3.

Referring to FIGS. 1 and 2, between times T1 and T2, a gateway switch occurs since the feeder link FL1 of the satellite SAT1 switches from gateway GW1 (on FIG. 1 at time T1) to gateway GW2 (on FIG. 2 at time T2). Such gateway switch of the satellite SAT1 may notably be due to the movement of satellite SAT1 between times T1 and T2. In particular, the cells C1' to C3' deployed by satellite beams B1' to B3' of satellite SAT1 at time T1 are switched off since the base stations BS1' to BS3' managing cells C1' to C3' are located by the gateway GW1 and no feeder link supports signaling between satellite SAT1 and gateway GW1 anymore. As satellite SAT1 establishes a new feeder link FL1 with gateway GW2 at time T2, base stations BS1 to BS3 located by the gateway GW2 may manage new satellite beams B1 to B3 of the satellite SAT1, resulting in satellite SAT1 deploying new cells C1 to C3 via satellite beams B1 to B3, as represented on FIG. 2 at time T2.

From the perspective of user equipment UE0, UE1 which are in the coverage zone of satellite SAT1 before the gateway switch (at time T1), a cell switch occurs since source cells C1' and C3' managed by source base stations BS1' and BS3' are respectively switched off and replaced by cells C1 and C3 managed by base stations BS1 and BS3. At time T2, user equipment UE is thus covered by cell C1 and user equipment UE1 is covered by cell C3. Such cell switch thus potentially impacts on all UEs covered by satellite SAT1 (thus on UEs initially covered by cells C1' to C3' at time T1). As a consequence, in order to maintain communication with the wireless communication network, user equipment UE0 under the coverage of a source cell C1' managed by a base station BS1' has to perform a handover in order to maintain connection with satellite SAT1 through the base station BS1 which corresponding cell C1 replaces the source cell C1'. More precisely, between times T1 and T2, user equipment UE0 needs to perform a handover from the source cell C1' to its target cell C1 due to a gateway switch between gateways GW1 and GW2 for satellite SAT1. Similarly, user equipment UE1 needs to perform a handover from its source cell C3' to its target cell C3 between times T1 and T2. Such handover scenario may potentially be performed in a massive way: all UEs covered by the footprint of satellite SAT1 (that is, by cells C1' to C3') will have to perform a handover to the new cells C1 to C3 deployed by the satellite after the gateway switch.

Referring to FIGS. 2 and 3, the fixed geographic region including locations of user equipments UE0 and UE1 encounters another change of coverage, as satellites SAT1 and SAT2 of the satellite communication network move with respect to the fixed geographic region on the Earth surface. Satellites SAT1, SAT2 are considered to have steerable satellite beams B1 to B6. More precisely:

- between times T2 and T3, the movement of satellite SAT1 leads to cell C3 being switched off from its current coverage zone and being redeployed in a new coverage zone (as shown by the bold ellipse of cell C3), as represented by FIGS. 2 and 3.
- between times T2 and T3, the movement of satellite SAT2 leads to cell C6 being switched off from its current coverage zone and being redeployed in a new coverage zone (as shown by the bold ellipse of cell C6), as represented by FIGS. 2 and 3. In particular, the new coverage zone of cell C6 corresponds to the current coverage zone of cell C3 of satellite SAT1 at time T2: cell C6 thus replaces cell C3 between times T2 and T3.

As a consequence, between times T2 and T3, user equipments UE0, UE1 are potentially covered by new cells:

- for example, at time T2, user equipment UE0 is initially connected to its source base station BS1 (for example after a handover procedure from cell C1' to cell C1 between times T1 and T2 as detailed previously) corresponding to source cell C1 of satellite SAT1. The change of coverage occurring between times T2 and T3 may lead to cell C3 of satellite SAT1 being redeployed so that cell C3 covers the location of user equipment UE0 as illustrated on FIG. 3. Providing better and/or more sustainable connection conditions in cell C3 for example, the user equipment UE0 may perform a handover from its source cell C1 to its target cell which is cell C3. In such case, between times T2 and T3, user equipment UE0 may perform an intra-satellite handover, since its source cell C1 and its target cell C3 both belong to the same satellite SAT1;
- for example, at time T2, user equipment UE1 is initially connected to its source base station BS3 corresponding to source cell C3 deployed by satellite SAT1. The change of coverage occurring between times T2 and T3 leads to a situation where the source cell C3 covering the user equipment UE1 corresponding to the source base station BS3 will be replaced by the cell C6 corresponding to the base station BS6 of satellite SAT2, as represented by FIG. 3. Thus, the user equipment UE1 will have to perform a handover from its source cell C3 to a target cell which is cell C6. Therefore, between times T2 and T3, user equipment UE1 has to perform an inter-satellite handover, since the source cell C3 and the target cell C6 belong to different satellites (satellites SAT1 and SAT2 respectively).

As a consequence, at each change of coverage in the fixed geographic region, each concerned user equipment UE0, UE1 needs to obtain its own value to be used as the timing advance in its own target cell in order to connect to its target base station and pursue communication with the network. Existing methods for obtaining such timing advance in the target cell by launching the classic RACH procedure for example consume a large amount of radio resources, time and are exposed to potential access failure, notably when many UEs need to perform a handover to a same target cell within a very short amount of time.

The present description details several embodiments of a method enabling a user equipment to determine the value to be used as the timing advance in the target cell of the network, notably when such user equipment needs to perform a handover between a source cell and a target cell due a change of coverage between the source cell and the target cell with any cell switch conditions.

Such a method relies on the user equipment UE0, UE1 determining the value to be used as the timing advance TA2 in their respective target cells based on different parameters TA1, P1, P2. In particular, such value is determined by the user equipment UE, UE1 before the user equipment UE0, UE1 sends any signal to the target base station and before the target base station receives any signal from the user equipment UE0, UE1 and/or identifies the user equipment UE0, UE1 as being a user equipment intending to connect, connecting to or being connected to the target base station. The aim of the present invention is to enable the user equipment UE0, UE1 to determine the value to be used as the timing advance in the target cell without requiring the target base station to determine such value to be used as the timing advance in the target cell and/or to signal it at the intention of the user equipment UE0, UE1.

Referring to FIG. 2, at time T2, user equipment UE1 is located within cell C3 on the Earth surface and is connected to the source base station BS3 of satellite SAT1. That is, at a time prior to T2 (not represented on FIG. 2), user equipment UE1 has launched an access procedure to connect to the source base station BS3, either through an initial access or through a handover procedure. At time T2, the predefined movements of satellites SAT1, SAT2 as well as the predefined successive coverage zones of all cells C1 to C6 enable the core network and potentially any network entity to predict that the source cell C3 corresponding to the source base station BS3 (and also corresponding to the satellite beam footprint of beam B3 here) of satellite SAT1 will be switched off from its current coverage zone (which includes the location of user equipment UE1) in a predictable time and will be replaced by cell C6 corresponding to the base station BS6 (and also corresponding to the satellite beam footprint of beam B6 here) of a different satellite SAT2. In particular, the source base station BS3 of user equipment UE1 has knowledge about this pending cell and satellite switch as well as the time duration before such switch occurs.

At a time when the user equipment UE1 is connected to the source base station BS3, for example at time T2, the source base station BS3 may emit a message to user equipment UE1 in order to inform the user equipment UE1 about such imminent switch between cells C3 and C6. User equipment UE1 thus identifies cell C6 deployed by satellite SAT2 as its target cell and triggers a process to determine the value to be used as a timing advance TA2 in its target cell C6, according to the method as disclosed in the present description. Such message emitted by the source base station BS3 to the user equipment UE1 may refer to a handover command sent by the source base station BS3 to the user equipment UE1. Such message emitted to the user equipment UE1 by the source base station BS3 may contain:

- the identity of potential target cell(s) for the user equipment UE1, corresponding to an identifier of target cell C6 here for example, and
- a handover time $T_{HO}$, which refers to a time at which the user equipment UE1 has to perform a handover and connect to the target cell C6. Alternatively, the handover command may contain another time-related value indicating the maximum time before the user equipment UE1 has to perform a handover and connect to its target cell C6.

The user equipment UE1, upon receiving such message from the source base station BS3 through the source cell C3 at a time between times T2 and T3, triggers the process to determine its value to be used as a timing advance TA2 in the target cell C6. To that end, the user equipment UE1 relies on at least three parameters:

- a timing advance TA1 used by the user equipment UE1 in the source cell C3,
- a first parameter P1, and
- a second parameter P2.

To that end, the user equipment UE1 may determine the value to be used as the timing advance TA2 in the target cell C6 by computing based on the following formula:

$$TA2=2P1-2P2+TA1 \quad (1)$$

Such formula (1) proposes a general computable expression enabling the user equipment UE1 to determine a value of the timing advance TA2 to be used in the target cell C6. In other embodiments, the formula (1) may include one or several additional terms such as a pre-configured offset relating to preconfigured specificities between the source cell and the target cell such as frequency bands or spectral coexistence scenarios between the corresponding satellites for instance. Depending on sign conventions of the first and second parameters P1 and P2 for instance, the factors and signs of parameters P1, P2 and TA1 in the formula (1) can also be adapted.

The timing advance TA1 used by the user equipment UE1 in the source cell C3 is known by the user equipment UE1 on a periodical basis since the user equipment UE1 is connected to the source base station BS3 when triggering the process to determine the value to be used as a timing advance TA2 in the target cell C6. Indeed, once the user equipment UE1 is in an RRC connected mode with the source base station BS3, the user equipment UE1 performs uplink (UL) transmissions to the source base station BS3 by regularly adjusting the amount of time needed to advance such UL transmissions. Such amount of time, corresponding to the timing advance TA1 to be used by the user equipment UE1 in the source cell C3 is regularly determined by the source base station BS3 and communicated to the user equipment UE1 through a Timing Advance Command (TAC) via MAC-Control Element (MAC-CE) signaling, as such timing advance TA1 to be used in the source cell C3 regularly changes due to the constant movement of satellites.

As a consequence, the timing advance TA1 used by the user equipment UE1 in the source cell C3 is periodically updated and obtained by the user equipment UE1 according to existing methods. The source base station BS3 may also send a time function or a time pattern enabling the user equipment UE1 to deduce an updated value of the timing advance TA1 to be used in the source cell C3. As a consequence, the user equipment UE1 is able to obtain a plurality of values of timing advance TA1 used in the source cell C3 throughout time. The timing advance TA1 to be used in the formula (1) may correspond to the latest updated value of timing advance TA1 in the source cell C3 with respect to the handover time $T_{HO}$. That is, the timing advance TA1 in the source cell C3 should correspond to the timing advance TA1 to be used in the source cell C3 at a time as close as possible to the handover time $T_{HO}$. The source base station BS3 may also send to the user equipment UE1 an estimated value of the timing advance TA1 in the source cell C3, such estimated value of the timing advance TA1 being estimated by the source base station BS3 at a time as close as possible to the handover time $T_{HO}$.

The second parameter P2 is received by the user equipment UE1 from the source base station BS3 when the user equipment UE1 is still connected to the source base station BS3, that is, at a given time between times T2 and T3. The second parameter P2 may be embedded in the message sent by the source base station BS3 to the user equipment UE1.

Such second parameter P2 is specific to a couple of cells corresponding to the source cell C3 and the target cell C6 of the user equipment UE1 (and is thus specific to a pair of base stations corresponding to the source base station BS3 and the target base station BS6). As a consequence, the second parameter P2 is potentially a parameter common to several UEs, such as all UEs within a given geographic area which are connected to the same source cell and are about to perform a handover to the same target cell. Such given geographic area can correspond to the whole source cell itself (if all user equipments connected to such source cell have the same target cell) or a delimited geographic zone within the source cell (if different groups of user equipment connected to the source cell will, depending on a geographic criterion for instance, perform handovers to different target cells). In both cases, the core network and more specifically, the source base station BS3 has the capacity to determine the second parameter P2 of all user equipments covered by the source cell C3 as well as to identify to which user equipments potentially share a common value of the second parameter P2. Such capacity of the source base station BS3 will be detailed further in the description.

In particular, the second parameter P2 may correspond to a desynchronization offset between the source base station BS3 and the target base station BS6. As a consequence, if the source base station BS3 and the target base station BS6 are co-located, for instance onboard a same satellite or a same gateway, the source base station BS3 and the target base station BS6 are synchronous and the source base station BS3 determines the second parameter P2 to be null. The establishing of the second parameter P2 by the source base station BS3 will be detailed further in the description.

The first parameter P1 is determined by the user equipment UE1. In an embodiment, the first parameter P1 is a duration which is determined based on times of arrival at the user equipment UE1 of two signals received respectively from the source base station BS3 (through the source cell C3) and the target base station BS6 (through the target cell C6). The determination of such first parameter P1 will be detailed next in the description of FIG. 4.

Figure 4:
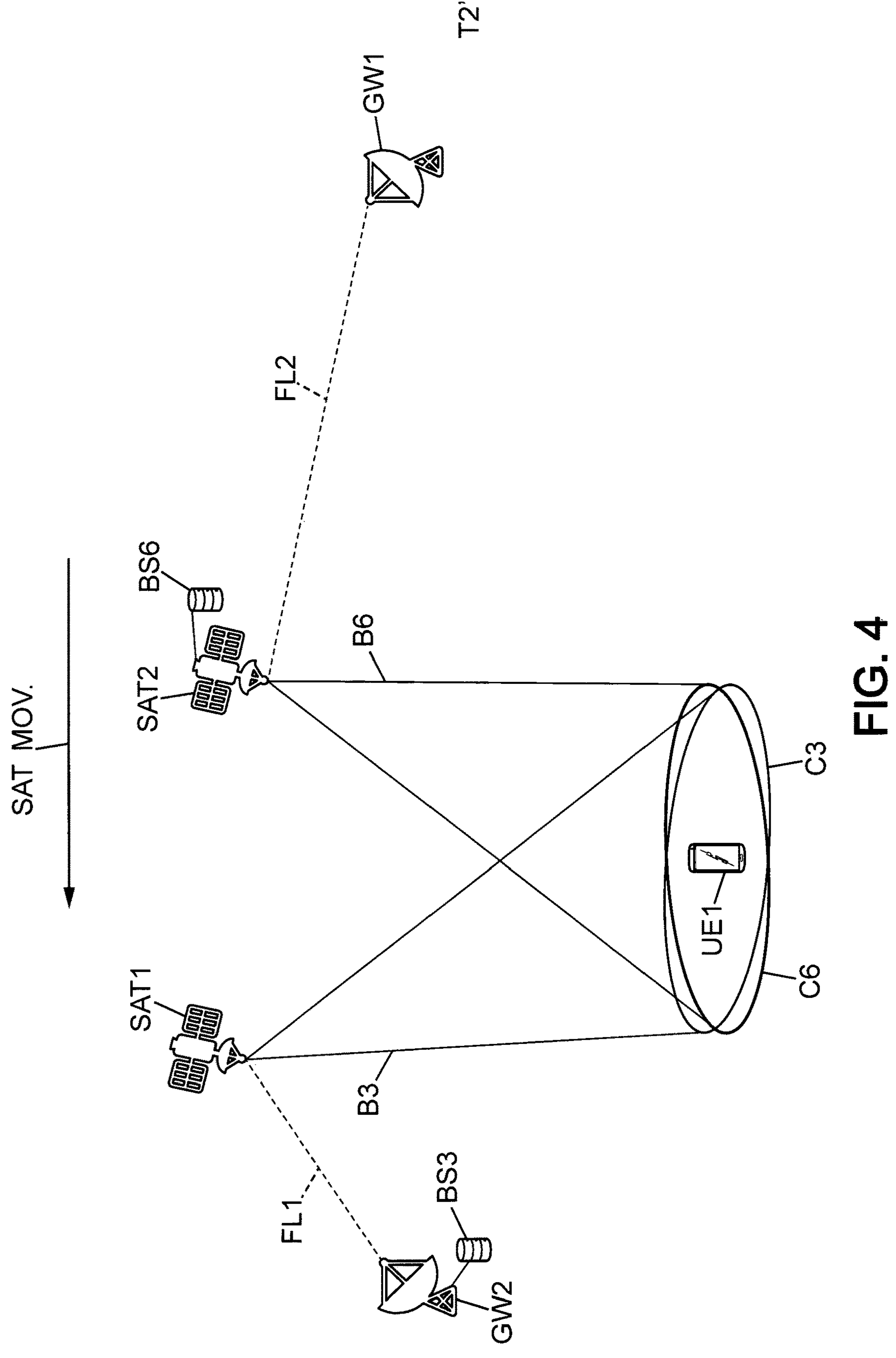
FIG. 4 represents a method implemented by a user equipment in a part of a satellite communication network to determine a first parameter according to an embodiment of the invention.

It is now referred to FIG. 4. FIG. 4 represents part of the satellite communication network and part of the fixed geographic region where user equipment UE1 is located at a time T2', which is an intermediary time between times T2 and T3. The part of the satellite communication network is the same as the one represented on FIGS. 1 to 3, but for the sake of clarity, only relevant cells C3 and C6, satellite beams B3 and B6 and base stations BS3 and BS6 are represented on FIG. 4. In this context, cell C3 of satellite SAT1 will be switched off and replaced by cell C6 of satellite SAT2. Satellites SAT1 and SAT2 are considered to be equipped with steerable satellite beams B3 and B6. According to FIG. 4, the cell switch between the source cell C3 and the target cell C6 is considered to occur in a soft cell switch scenario. That is, the target cell C6 managed by the target base station BS6 of satellite SAT2 is switched on the part of the fixed geographic region on the Earth surface currently covered by the source cell C3 managed by the source base station BS3 of satellite SAT1 before such source cell C3 is actually switched off to be deployed elsewhere on the Earth surface. Such scenario may occur if satellites SAT1 and SAT2 have steerable beams/fixed beam footprints and the target cell C6 of satellite SAT2 is switched on in this part of the fixed geographic region of the Earth surface while the source cell C3 is still switched on that fixed geographic region (that is, prior to switching off the source cell C3 to be redeployed elsewhere on the Earth surface), as illustrated by FIG. 4. A similar situation (possibly with different cell name labelling), not represented on FIG. 4, may also occur if satellites SAT1, SAT2 have fixed satellite beams/moving beam footprints and if the predetermined satellite ephemerides followed by satellites SAT1 and SAT2 include overlapping areas between different cells as the satellites SAT1 and SAT2 and thus their footprints progressively move with respect to the Earth surface. As a consequence, the soft cell switch scenario can lead to the situation represented on FIG. 4, in which at a given time T2' and during a predictable overlapping time duration (such overlapping time duration being at most equal to T3−T2'), the source cell C3 and the target cell C6 overlap on the Earth surface in at least part of the fixed geographic region. After the overlapping time duration, the source cell C3 is switched off and redeployed elsewhere (as represented by FIGS. 2 and 3) and only the target cell C6 remains in the part of the fixed geographic region. The coverage zones of the source cell C3 and the target cell C6 may not fully overlap depending on various parameters including the respective shapes of the cells C3 and C6 as well as the orientation and position of satellites SAT1, SAT2 and their satellite beams B3 and B6 projecting the respective cells C3 and C6. As a consequence, the coverage zones of the source cell C3 and the target cell C6 may slightly differ but present a major overlapping zone (for example a common center part of the cells C3 and C6), as represented on FIG. 4.

In the case of a soft cell switch scenario wherein an overlapping time duration exists, as represented on FIG. 4, the user equipment UE1, which is initially covered by the source cell C3, is simultaneously covered by its source cell C3 and its target cell C6 during the predictable overlapping time duration. As a consequence, during such overlapping time duration, the user equipment UE1 is able, on the one hand, to be still connected to the source base station BS3 and to receive at least one first signal from the source base station BS3. On the other hand, during such overlapping time duration, the user equipment UE1 is also able to receive at least a second signal from the target base station BS6, such second signal being a signal emitted by the target base station BS6 in the target cell C6.

The source base station BS3 can optionally send the overlapping time duration to the user equipment UE1 so that the user equipment UE1 measures times of arrival of at least the first signal and the second signal received respectively from the source and the target base stations BS3 and BS6 during such overlapping time duration. The overlapping time duration may be sent to the user equipment UE1 by the source base station BS3 at a time prior to the moment such overlapping between the source cell C3 and the target cell C6 begins (that is, referring to FIG. 4, at a time prior to time T2'). Such overlapping time duration can be embedded within the message sent by the source base station BS3 to the user equipment UE1. Alternatively, the source base station BS3 may not send the overlapping time duration to the user equipment UE1 since the user equipment UE1 may measure times of arrival of signals including times of arrival of the first and second signals in a continuous way, including during the overlapping time duration.

During the overlapping time duration, the user equipment UE1 is thus able to obtain measures of at least the first and second signals received respectively from the source base station BS3 through the source cell C3, and from the target base station BS6 through the target cell C6, based on which the user equipment UE1 can determine the first parameter P1. More precisely, the first parameter P1 may be a time duration determined by the user equipment UE1 as a time different between:

- a first time determined based on at least the time of arrival of the first signal from the source base station BS3, and
- a second time determined based on at least the time of arrival of the second signal from the target base station BS6.

Such times of arrival of the first and second signals from respectively the source base station BS3 and the target base station BS6 may be effectively measured by the user equipment UE1 after T2' and within the overlapping time duration. That is, during the overlapping time duration, the user equipment UE1 may receive the first signal from the source base station BS3 at a given time of arrival and the second signal from the target base station BS6 at a given time of arrival. To that end, the user equipment UE1 is equipped with a clock or any other time measurement module which enables the user equipment UE1 to measure the times of arrival of the first and second signals arriving at the user equipment UE1 from the network. Therefore, in this case the first time corresponds to the time of arrival of the first signal and the second time corresponds to the time of arrival of the second signal.

The first time and the second time whose time difference directly results in the first parameter P1 may both be in a time interval predefined by the network. By ensuring that the first time and the second time used to determine the first parameter P1 both belong to the time interval, it is guaranteed that the corresponding signals are not part of subframes which are too spaced one from another. The first parameter P1 thus accurately reflects an actual time difference between signals which are actually comparable for example since they are spaced by less than a frame, meaning that signals are actually sent in a more or a less concomitant way and that the first parameter P1 actually reflects the propagation delay difference between the two signals which reach the user equipment UE1. For example, if a signal sent by the source base station BS3 corresponding to a subframe #4 and another signal sent by the target base station BS6 corresponding to a subframe #6 have their respective times of arrival at the user equipment UE1 compared, the obtained first parameter P1 must take into account the difference of time between subframe #4 of the source base station BS3 and subframe #6 of the target base station BS6, as well as the frame duration (or respective frame durations) independently from the propagation time difference between the respective two base stations BS3, BS6 and the user equipment UE1.

Such time interval thus defines on the one hand, a maximum time gap between the first time and the second time used to determine the first parameter P1 and on the other hand, a moment range of the first parameter P1. Indeed, the time interval may be close to the handover time $T_{HO}$, so that the first parameter P1 is relevantly considered to reflect a time difference of arrival of signals from the source and the target base stations BS3, BS6 at a time close to the moment the user equipment UE1 has to perform the handover from the source cell C3 to the target cell C6. The time interval may be sent by the source base station BS3 to the user equipment UE1, for instance within the message sent by the source base station BS3 to the user equipment UE1.

If the times of arrival of the first signal and the second signal received respectively from the source base station BS3 and the target base station BS6 both belong to the time interval, then the user equipment UE1 may determine that the first time corresponds to the time of arrival of the first signal and that the second time corresponds to the time of arrival of the second signal, the first parameter P1 being determined by the user equipment UE1 as a time difference between two times of arrival actually measured by the user equipment UE1 during the overlapping time duration and within the time interval.

However, if at least one time of arrival among the times of arrival of the first signal and the second signal received respectively from the source base station BS3 and the target base station BS6 is not in the time interval, such time of arrival cannot be directly used to determine the first parameter P1. This may be the case if the user equipment UE1 is not able to actually measure two times of arrival of two signals from different base stations BS3, BS6 within the time interval. As a consequence, at least one time among the first time and the second time has to be estimated by the user equipment UE1 based on the time of arrival of respectively the first signal and the second signal. Such estimation of the first time and/or of the second time respectively may rely on:

- the measured time of arrival of the latest actually received first signal from the source base station BS3, and/or
- the measured time of arrival of the first actually received second signal from the target base station BS6, and/or
- a time variation or time pattern of signal emissions from BS3 and/or BS6, and/or
- specific characteristics of the network such as the frame or a slot duration of the source base station BS3 (and/or the target base station BS6), such characteristics being received by the user equipment UE1 from the source base station BS3 and embedded in the message sent from the source base station BS3 for instance.

As a consequence, the first parameter P1 may correspond to a time difference between a first time and a second time which correspond:

- to the measured times of arrival of the first and second signal (option 1), or
- to estimations by the user equipment UE1 based on the measured times of arrival of the first and second signal and the time variation or time pattern of signal emissions to deduce times of arrival included in the time interval (for example a time interval of the size of a frame) at the UE1 of signals emitted by the base stations BS3, BS6 but that could not be effectively received or decode by UE1 (option 2), or
- to a combination, that is one of the time among the first and second times is a measured time of arrival and the other time among the first and second times is an estimation by the user equipment UE1 based on the other measured time of arrival and the time variation or time pattern of signal emissions to deduce times of arrival included in the time interval (for example a time interval of the size of a frame) at the UE1 of signals emitted by the base stations BS3, BS6 but that could not be effectively received or decode by UE1 (option 3).

In a situation not represented on FIG. 4, the cell switch between the source cell C3 and the target cell C6 may occur in a hard cell switch scenario. In this case, the target cell C6 managed by the target base station BS6 of satellite SAT2 is switched on at least part of the fixed geographic region of the Earth surface after the source cell C3 managed by the source base station BS3 of satellite SAT1 is actually switched off to be deployed elsewhere on the Earth surface. Such hard cell switch scenario may occur for example if satellites SAT1 and SAT2 have steerable beams/fixed beam footprints and if the source cell C3 is configured to be switched off before being replaced by the target cell C6 in the fixed geographic region. As a consequence, the hard cell switch scenario leads to a situation when a user equipment UE1 currently covered by the source cell C3 and connected to the corresponding source base station BS3 is only covered by one cell at a time and will be successively—but not simultaneously—covered by the source cell C3 and the target cell C6. Such hard cell switch scenario may for instance be illustrated by FIGS. 2 and 3 if, from time T2 the part of the satellite communication network represented on FIG. 2 evolves directly to a situation as represented on FIG. 3 at time T3 without the occurrence of the time T2' and the situation represented on FIG. 4.

In the case of a hard cell switch scenario, the user equipment UE1 may receive data related to the hard cell switch from the source base station BS3 at a moment when the user equipment UE1 is still connected to the source base station BS3, for example at time T2 on FIG. 2. Such data related to the hard cell switch may include:

a value related to a switch time, the switch time corresponding to a time when the hard cell switch between the source cell C3 and the target cell C6 will occur. Such switch time may differ from the handover time $T_{HO}$ since the user equipment UE1 may apply a pause timer (for example required to the user equipment UE1 by the source base station BS3), which refers to a time duration when the user equipment UE1 is under the coverage of the target cell C6 (that is, at the switch time) without initiating an access procedure to the target cell C6 (that is, at the handover time $T_{HO}$) yet; and/or a time trigger which indicates to the user equipment UE1 that it has to measure and possibly process and/or store the times of arrival of successive first signals actually received from the source base station BS3. Such time trigger may correspond to the reception of the indication signal itself or may set a differed time trigger at which the user equipment UE1 starts to measure and process/store the times of arrival of successive first signals actually received from the source base station BS3 (and for example, until the cell switch occurs and the user equipment UE1 does not receive signals from the source base station BS3 anymore).

The user equipment UE1 may still receive the time interval from the source base station BS3 (so, before the hard cell switch), for instance within the message sent by the source base station BS3 to the user equipment UE1.

After the hard cell switch occurs at the switch time, the user equipment UE1 is covered by the target cell C6 without being covered by the source cell C3 anymore (such situation is for example illustrated on FIG. 3 at time T3). After the hard cell switch, the user equipment UE1 receives at least one second signal from the target base station BS6 and is able to measure a time of arrival of at least a second signal actually received from the target base station BS6. In particular, the user equipment UE1 is potentially able to measure a time of arrival of a second signal which is in the time interval.

However, the times of arrival of first signals received from the source base station BS3 and measured by the user equipment UE1 before the hard cell switch may not be in the time interval. In such case, the user equipment UE1 may estimate the first time to be used to determine the first parameter P1 based on:

the measured time of arrival of the latest actually received first signal from the source base station BS3, and/or the measured time of arrival of the first actually received second signal from the target base station BS6, and/or a time variation or time pattern of signal emissions from BS3, and/or specific characteristics of the network such as the frame or a slot duration of the source base station BS3, such characteristics being received by the user equipment UE1 from the source base station BS3 before the hard cell switch and embedded in a message sent from the source base station BS3 for instance. Such specific characteristics of the network may also be known by the user equipment UE1 beforehand (for example, when the user equipment UE1 first accesses the source cell C3).

As a consequence, the first parameter P1 may correspond to a time difference between a first time and a second time which corresponds to either to option 2 or option 3. For example, the first time is an estimation by the user equipment UE1 based on the measured time of arrival of the first signal and the time variation or time pattern of signal emissions of the BS3 and the second time is a measured time of arrival of the second signal (that is a signal received from BS6).

The user equipment UE1 may receive an indicative value from the source base station BS3 based on which the user equipment UE1 determines the first parameter P1. Said indicative value can for instance be embedded in the message emitted by the source base station BS3 when the user equipment UE1 is under the coverage of the source cell C3 (for instance, at time T2 or time T3), or known by the UE from a pre-configuration or from another message previously received from the source base station BS3 or another base station it was previously attached to. Such indicative value may contain instructions for the user equipment UE1 to directly determine the first parameter P1, for instance only based on the indicative value or only based on the indicative and a fixed value predefined by the user equipment.

The criteria for determining the first parameter P1 based on an indicative value received from the source base station BS3 will be described further in the description.

Figure 5:
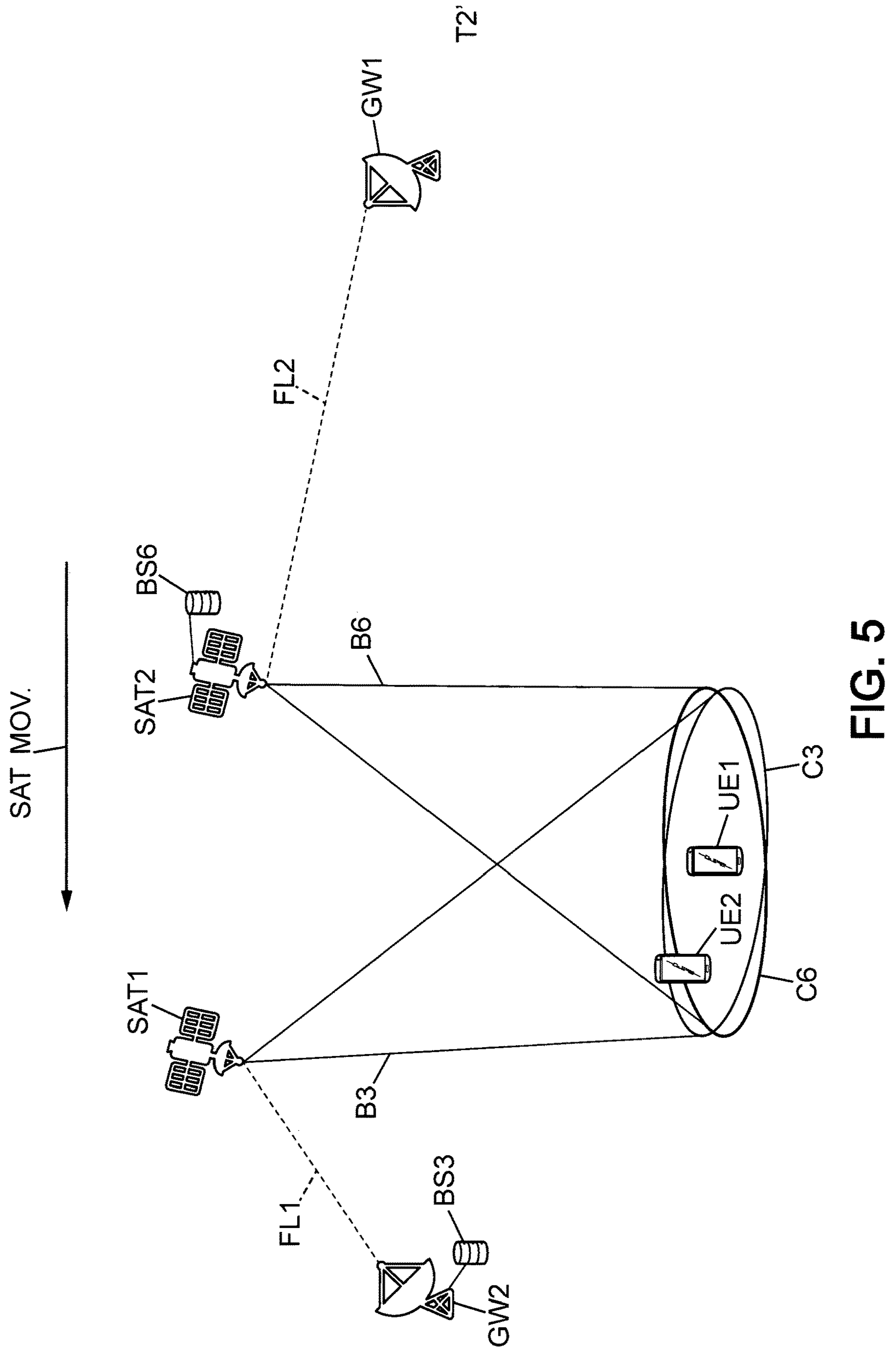
FIG. 5 represents a method implemented by a network in a part of a satellite communication network to perform a handover of a user equipment from a source cell to a target cell according to an embodiment of the invention.

It is now referred to FIG. 5. FIG. 5 represents part of a satellite communication network and the fixed geographic region which includes the user equipment UE1 at a time T2' similar to FIG. 4. Satellites SAT1, SAT2, satellite beams B3 and B6, base stations BS3 and BS6 and their corresponding cells C3 and C6 as well as the user equipment UE1 remain unchanged with respect to FIG. 4. A second user equipment UE2 is added in the satellite communication network of FIG. 5.

In a similar way to FIG. 4, the FIG. 5 represents an intermediary step of the cell switch between cell C3 deployed by satellite SAT1 and cell C6 deployed by satellite SAT2. In the context of FIG. 5, satellites SAT1 and SAT2 are considered to be equipped with steerable satellite beams B3 and B6. The cell switch between cells C3 and C6 is considered to occur in a soft scenario: at time T2', cell C6 is deployed in the part of the fixed geographic region currently covered by the cell C3 before such cell C3 is switched off to be deployed elsewhere by satellite SAT1 on the Earth surface.

Referring to FIG. 5 at time T2', the user equipment UE1 and the second user equipment UE2 are covered by the source cell C3. The cell C6 corresponding to base station BS6 of satellite SAT2 is the cell downstream to the source cell C3 and will replace the source cell C3 within a predictable time duration as detailed in the description of FIG. 4. The source base station BS3 may identify that cell C6 will replace source cell C3 and thus identifies the cell C6 as the target cell C6 of the user equipments UE1, UE2. That is, both the user equipment UE1 and the second user equipment UE2 will need to perform a handover procedure to access the target cell C6 at a given handover time $T_{HO}$, such handover time $T_{HO}$ may be different for each user equipment UE1, UE2.

At time T2', both the user equipment UE1 and the second user equipment UE2 are simultaneously covered by their common source cell C3 and their common target cell C6.

The network considers performing the handover of the user equipment UE1 from the source cell C3 to the target cell C6 using a value to be used as a timing advance TA2 in the target cell C6 determined by the user equipment UE1. To that end, the network aims at determining the second parameter P2 to be used by the user equipment UE1 to determine its value to be used as a timing advance TA2 in the target cell C6. The network determining the second parameter P2 may refer to any network entity such as the source base station BS3 for example.

In order to determine the second parameter P2 to be sent to the user equipment UE1, the source base station BS3 starts by selecting at least another user equipment different from user equipment UE1, such as the second user equipment UE2. The source base station BS3 may also select another or several other user equipment(s) (which are not represented on FIG. 5). The criteria for selecting another user equipment in order to determine the second parameter P2 will be detailed further. The source base station BS3 will rely at least on a timing advance TA2* of the second user equipment UE2 in the target cell C6 and on a timing advance TA1* of the second user equipment UE2 in the source cell C3 to obtain the second parameter P2.

The timing advance TA2* of the second user equipment UE2 in the target cell C6 may be obtained at a time when:

- the second user equipment UE2 is connected to the target base station BS6 (which is not the case on FIG. 5), and/or
- the second user equipment UE2 is at least in the coverage zone of the target cell C6 (which is the case represented on FIG. 5).

The timing advance TA2* of the second user equipment UE2 in the target cell C6 may be obtained through existing methods or by the method as disclosed (that is, the second user equipment UE2 determines its value to be used as a timing advance TA2* in the target cell C6). The second user equipment UE2 may also be instructed by the source base station BS3 to launch the following process so as to determine the second parameter P2.

In the case of the second user equipment UE2 launching a process instructed by the source base station BS3 so as to determine the second parameter P2, the second user equipment may be selected so that the selected second user equipment is or have been in the coverage zone of the source cell C3. The second user equipment is also selected by the source base station BS3 based on the fact that the second user equipment has the same target cell C6 as the user equipment UE1, the second user equipment being moreover covered by the target cell C6 when launching the process instructed by the source base station BS3 to determine the second parameter P2 (such as the second user equipment UE2 on FIG. 5).

Indeed, since the second parameter P2 is a value specific to a couple of cells formed by a source cell and a target cell, by selecting the second user equipment as having (or having had) the same source cell C3 and the same target cell C6 as the user equipment UE1, the user equipment UE1 and the second user equipment share theoretically the same value of the second parameter P2. The second user equipment may thus be selected based on common features that the second user equipment shares with the user equipment UE1 such as similar source and target cells C3 and C6 or that the user equipment UE1 is in a situation close to the situation the second user equipment has been into at a prior time, before being covered by the target cell C6.

Other supplementary criteria may be considered by the source base station BS3 in order to select the second user equipments and will be detailed further in the description.

Once the second user equipment is selected by the source base station BS3, for example as corresponding to the user equipment UE2 on FIG. 5, the source base station BS3 may send an instruction message to the second user equipment UE2 at a time T2' to instruct the process to be launched by the second user equipment UE2, such process consisting in determining the timing advance TA2* of the second user equipment UE2 in the target cell C6 according to the following description.

The second user equipment UE2 may send a signal to the target base station BS6 at a time corresponding to time T2' or later than time T2', such time particularly corresponding to a time when the second user equipment UE2 is covered by the target cell C6 (referring to FIG. 5, such time may be time T2'). Such signal sent to the target base station BS6 by the second user equipment UE2 may contain a sequence to indicate that no handover procedure is initiated by such signal, such as in the case of an uplink preamble RACH (PRACH) signal for example. The signal sent to the target base station BS6 by the second user equipment UE2 uses a testing value of timing advance, such testing value of timing advance being for example predetermined and sent to the second user equipment UE2 by the source base station BS3. The testing value of timing advance may also correspond to the latest timing advance TA1* of the second user equipment UE2 in the source cell C3, which is a priori a value updated by the source base station BS3 at a time prior to time T2' and known by both the source base station BS3 and the second user equipment UE2. The second user equipment UE2 may also use any other value as the testing value of timing advance and such value may be reported to the source base station BS3.

Upon receiving the signal from the second user equipment UE2 using the testing value of timing advance, the target base station BS6 is able to measure a timing advance error of the signal as received from the second user equipment UE2 and send such timing advance error as a feedback either to the source base station BS3 or to the second user equipment UE2. Based on the testing value of timing advance used by the second user equipment UE2 and the timing advance error measured by the target base station BS6, the source base station BS3 is able to determine the timing advance TA2* in the target cell C6 of the second user equipment UE2. Alternatively to the source base station BS3 determining the timing advance TA2* in the target cell C6 of the second user equipment UE2, the target base station BS6 may feedback the timing advance error to the second user equipment UE2 which is able, based on the timing advance error received from the target base station BS6 and the testing value of timing advance used, to determine its timing advance TA2* in the target cell C6 and may send either such timing advance TA2*, or a value representative of the timing advance TA2*, or a value representative of the parameter P2 to the source base station BS3.

Alternatively to the process described for determining the timing advance TA2* of the second user equipment UE2 in the target cell C6, the source base station BS3 and/or the second user equipment UE2 can compute using any existing method enabling to obtain a timing advance TA2* in the target cell C6 of the second user equipment UE2.

In particular, if the testing value of timing advance used by the second user equipment UE2 corresponds to the latest timing advance of the second user equipment UE2 in the source cell C3 for example, the timing advance error as feedbacked by the target base station BS6 enables the source base station BS3 to directly obtain a time shift value TA1*−TA2* (or possibly an absolute time shift value) of the timing advance of the second user equipment UE2 from the source cell C3 to the target cell C6. The use of such direct time shift value TA1*−TA2* of the timing advance of the second user equipment UE2 will be detailed in the description of FIG. 6.

Referring to FIG. 5 at this stage, the source base station BS3 obtains:

- the timing advance TA2* in the target cell C6 of the second user equipment UE2, and the latest timing advance TA1* in the source cell C3 of the second user equipment UE2.

The second user equipment UE2 may also determine a value VAL based on times of arrival of signals received by the second user equipment UE2 from the source base station BS3 and the target base station BS6 respectively, such value and its determination being analogous to the first parameter P1 determined by the user equipment UE1 as detailed in the description of FIG. 4. Such value may then be sent by the second user equipment UE2 to the source base station BS3, for instance as a result from the instruction message instructed to the second user equipment UE2 by the source base station BS3.

Based on:

- the timing advance TA2* in the target cell C6 of the second user equipment UE2, and
- the latest timing advance TA1* in the source cell C3 of the second user equipment UE2, and
- the value VAL received from the second user equipment UE2, the source base station BS3 may determine the second parameter P2 which is a value specific to a couple of cells formed by cell C3 and cell C6, for example using formula (1) applied to values of the second user equipment UE2. The second user equipment UE2 may also determine the second parameter P2 on its side if it has determined its timing advance TA2* in the target cell C6 (for example, after receiving the feedback of the timing advance error from the target base station BS6) and may send the second parameter P2 as determined to the source base station BS3.

Such second parameter P2 being a value specific to a couple of cells formed by cell C3 and cell C6, it is common to all user equipments which determine their value to be used as a timing advance from the same source cell C3 to the same target cell C6. Referring to FIG. 5, the second parameter P2 as determined applies to both the user equipment UE1 and the second user equipment UE2. Such parameter P2 may thus be sent as a groupcast message from the source base station BS3 to user equipments covered by the source cell C3 and which will perform a handover to the target cell C6 (including user equipment UE1) or as a broadcast message in the source cell C3. Such parameter P2 may also be sent specifically to the user equipment UE1, for instance in the message sent to the user equipment UE1 in order for the user equipment UE1 to trigger its determination of its value to be used as a timing advance TA2 in the target cell C6.

Supplementary criteria for selecting, by the source base station BS3, the second user equipments may include one or a combination of the following elements:

- if there is a non-empty overlapping zone between the source cell C3 and the target cell C6 (in the case of a soft cell switch scenario between cells C3 and C6 as illustrated on FIG. 5 for instance, or in the case of a satellite with fixed beams/moving footprint), the second user equipments may be selected if they are located in the overlapping zone of cells C3 and C6 at time T2', so that such second user equipments may launch the process with the target base station BS6 as instructed by the source base station BS3 in the instruction message while being connected and able to perform reporting directly to the source base station BS3. That is for example the case of the second user equipment UE2 represented on FIG. 5. If the source cell C3 and the target cell C6 do not overlap (in the case of a hard cell switch scenario between cells C3 and C6 for example), the second user equipment UE2 will successively (but not simultaneously) be covered by the source cell C3 and the target cell C6. The process as instructed by the source base station BS3 in the instruction message may then be launched by the second user equipment UE2 after the cell switch between cells C3 and C6. The second user equipment UE2 may then perform reporting (for example to report its value VAL) to the target base station BS6 which can then transmit such reporting to the source base station BS3 using inter-satellite links (ISL) for example.
- the second user equipment may be selected by the source base station BS3 if the value VAL determined by each of the second user equipments is below a threshold, such threshold being for instance determined by the source base station BS3. This enables to determine the second parameter P2 as a function (the second parameter P2 being potentially an average) of only the timing advance TA2* in the target cell C6 of each of the second user equipments and the latest timing advance TA1 in the source cell C3 of each of the second user equipments. Such threshold may be sent as a groupcasted or broadcasted message to all potential second user equipments of the source cell (that is, to user equipments which have the same source cell C3 and the same target cell C6 as the user equipment UE1 for example). Each potential second user equipment, upon determining its value VAL, compares such value VAL to the threshold either pre-defined or indicated by the source base station BS3 and only sends such value VAL to the source base station BS3 if it is below the threshold. Each value VAL determined by each potential second user equipment may also be received by the source base station BS3 which compares it to the threshold and selects the corresponding second user equipments UE2.
- the second user equipments may be selected by the source base station BS3 if the difference between the timing advance TA2* in the target cell C6 of each of the second user equipments UE2 and the latest timing advance TA1 in the source cell C3 of each of the second user equipments is below a gap, such gap being predefined by the source base station BS3. This enables to determine the second parameter P2 as corresponding to the value VAL (or an averaged value of the value VAL) determined by each of the second user equipments. Such gap may be sent as a groupcasted or broadcast message to all potential second user equipments of the source cell (that is, to user equipments which have the same source cell C3 and the same target cell C6 as the user equipment UE1). Each potential second user equipment, upon obtaining their timing advance TA2* in the target cell C6, compares the difference between such timing advance TA2* and their latest timing advance TA1* in the source cell C3 to the gap indicated by the source base station BS3 and only sends a reporting to the source base station BS3 if such difference is below the gap. Each timing advance TA2* in the target cell C6 of potential second user equipments may also be determined or received by the source base station BS3 which compares it to the latest timing advance TA1* in the source cell C3 of the potential second user equipment, each second user equipment being selected if the difference between such timing advance TA2* and their latest timing advance TA1* in the source cell C3 is below the gap.
- the second user equipments may be selected by the source base station BS3 based on a geographic criterion such as the location of each of the second user equipments being nearby the location of the user equipment UE1 within a predefined distance threshold for instance, or the location of the second user equipments being in a selection zone predefined within the source cell C3 for example.

the second user equipments may also be selected based on the fact they were in a common handover situation with the user equipment UE1 at a prior time (such common handover situation may be characterized by the source base station BS3 based on the previous locations within the source cell C3 or on the successive timing advances in the source cell C3 of the such second user equipments which are close to the current locations within the source cell C3 or the successive timing advances in the source cell C3 of the user equipment UE1).

The source base station BS3 may also select a plurality of second user equipments so as to obtain a second parameter P2 based on:

an averaged value of the timing advances TA2* in the target cell C6 of each second user equipment UE2 of the plurality of second user equipments, and an averaged value of the latest timing advances TA1* in the source cell C3 of each second user equipment UE2 of the plurality of second user equipments, and an averaged value of the values VAL received from each second user equipment UE2 of the plurality of second user equipments.

Figure 6:
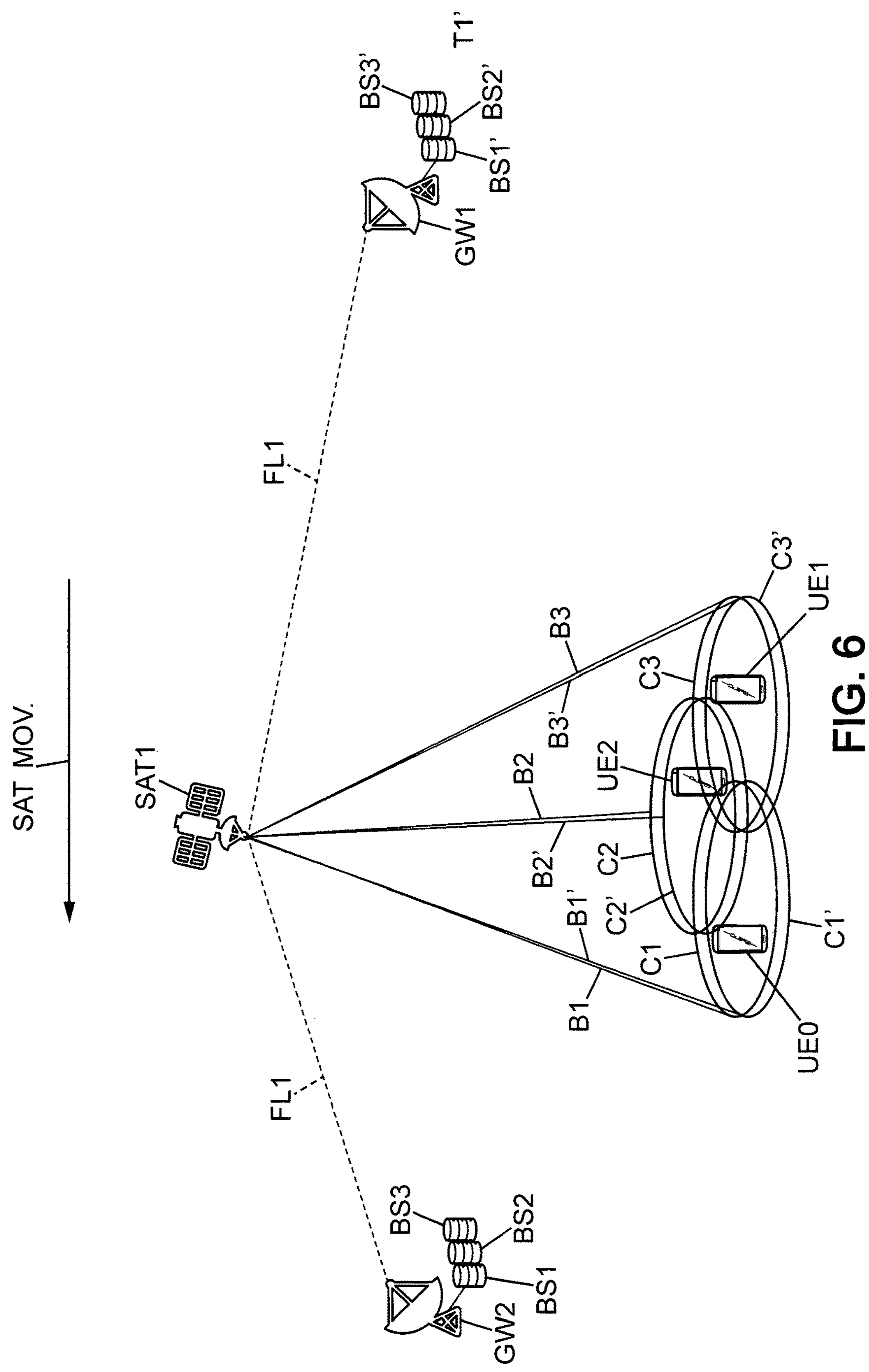
FIG. 6 represents a method implemented by a network in a part of a satellite communication network to perform a handover of a user equipment from a source cell to a target cell according to another embodiment of the invention.

It is now referred to FIG. 6. FIG. 6 represents part of the satellite communication network in a specific embodiment of a gateway switch occurring in a soft switch scenario. FIG. 6 represents a situation at a time T1' which is an intermediary time between times T1 and T2 corresponding to an intermediary situation between FIGS. 1 and 2, wherein the satellite SAT1 encounters a gateway switch between gateway GW1 and gateway GW2. For the sake of clarity, FIG. 6 only represents the satellite SAT1 (SAT2 is not represented). At time T1 on FIG. 1, a feeder link FL1 is established between satellite SAT1 and gateway GW1. The initial cells C1' to C3' deployed by satellite SAT1 are managed by initial base stations BS1' to BS3' located at the gateway GW1. At a time T1' on FIG. 6, the movement of satellite SAT1 leads to a transition of feeder link FL1 from gateway GW1 to gateway GW2. Such transition results in a time T2 on FIG. 2 when satellite SAT1 deploys new cells C1 to C3 managed by new base stations BS1 to BS3 which are located at the gateway GW2. In the context of FIG. 6, such transition occurs in a soft way, so that satellite SAT1 is served by both gateway GW1 and gateway GW2 at time T1'. As a consequence, satellite SAT1 deploys new cells C1 to C3 managed by the new base stations BS1 to BS3 while the initial cells C1' to C3' managed by the initial base stations BS1' to BS3' are still switched on.

FIG. 6 represents user equipments UE0 and UE1 as previously represented on FIGS. 1 and 2. FIG. 6 also adds a second user equipment UE2. UEs UE0, UE1 and UE2 are all initially covered by satellite SAT1: user equipment UE0 is covered by its source cell C1', user equipment UE1 and second user equipment UE2 are covered by their common source cell C3'. The gateway switch of satellite SAT1 between gateways GW1 and GW2 leads to all UEs needing to perform a handover to the new cells C1 to C3 deployed by satellite SAT1 in order to remain connected to the network through satellite SAT1. Thus, user equipment UE0 needs to perform a handover from its source cell C1' to its target cell C1, user equipment UE1 and second user equipment UE2 need to perform a handover from source cell C3' to target cell C3.

FIG. 6 represents an embodiment wherein UEs UE0, UE1, UE2 covered by satellite SAT1 are simultaneously covered by both their respective source cells C1', C3' and their respective target cells C1, C3 at time T1'. It is considered the handover of user equipment UE0 and user equipment UE1, such UEs UE0, UE1 determining their own value to be used as a timing advance TA2 in their respective target cells C1, C3. To that end, the network aims at determining the second parameter P2 to be sent to the UEs UE0 and UE1. The determination of such second parameter P2 may be performed here by a base station such as the source base station BS1' of user equipment UE0 or the source base station BS3' of user equipment UE1 for example.

The source base station (for example BS3') selects at least another user equipment different from UEs UE0, UE1 such as the second user equipment UE2 as previously detailed by the description of FIG. 5. As detailed, the source base station BS3' is able to obtain the time shift value TA1*−TA2* of the timing advance of the second user equipment UE2 from the source cell C3' to the target cell C3. In a general context, such time shift value TA1*−TA2* is a priori specific to the second user equipment UE2. However, in the context of a gateway switch as it is the case on FIG. 6, such time shift value TA1*−TA2* may be applicable as an exact and common time shift value of the timing advance of UEs UE0, UE1 from their respective source cells C1', C3' to their respective target cells C1, C3.

Indeed, in the case of a gateway switch of the satellite SAT1, all UEs UE0, UE1, UE2 covered by the satellite SAT1 will experience the exact same cell switch conditions within their respective source cells C1', C3' since the gateway switch changes the connection conditions at a satellite SAT1 scale. In particular, both user equipments UE0 and UE1, having a priori distinct timing advances in their respective source cells C1' and C3' (since they a priori have distinct geographic locations), will have a common time shift value of their respective timing advances in their respective source cells C1', C3' due to the gateway switch. As a consequence, by applying such common time shift to its own timing advance in its source cell C1', C3', each user equipment UE0 and UE1 will directly obtain its value to be used as a timing advance in its target cell C1, C3 after the gateway. Such common time shift particularly corresponds to the time shift TA2*−TA1* of the second user equipment UE2. Therefore, in the case of a gateway switch scenario concerning satellite SAT1, the time shift value TA1*−TA2* of the timing advance of the second user equipment UE2 from the source cell C3' to the target cell C3 is a value common to user equipments UE0 and UE1. Such time shift value TA1*−TA2* would also be common to all UEs covered by satellite SAT1 in cells C1' to C3' managed by base stations BS1' to BS3'. Therefore, in the case of a gateway switch scenario as represented on FIG. 6, by applying the common time shift value TA1*−TA2* to its timing advance TA1 in its source cell C1', C3', each user equipment UE0, UE1, UE2 covered by the satellite SAT1 is able to obtain its value to be used as a timing advance in its target cell C1, C3.

In such situation of a gateway switch scenario, the second parameter P2 may thus correspond to the time shift value TA1*−TA2* of the timing advance of the second user equipment UE2 from its source cell C3' to the target cell C3. Upon obtaining such second parameter P2 equaling TA2*−TA1*, the source base station BS3' may send such second parameter P2 to the user equipment UE1. The source base station BS3' may also send such second parameter P2 as a groupcasted or a broadcasted message within cell C3' or may transmit such second parameter to other base stations BS2', BS3' so that the common value of the second parameter P2 may be transmitted within other source cells C1' to C3' to other UEs covered by satellite SAT1 (typically to user equipment UE0). UEs covered by the satellite SAT1 may also communicate the common value of the second parameter P2 to each other through device-to-device communication for example.

The source base station BS3' may also send an indicative value (embedded in the same message containing the second parameter P2 or not). Such indicative value may contain a fixed value predefined by the network and/or instruct the user equipment UE1 that the cell switch conditions enable the user equipment UE1 to determine its value to be used as a timing advance in the target cell C6 based on only the second parameter P2 and the indicative value and optionally a fixed value predefined by the user equipment UE1. Upon receiving such indicative value, the user equipment UE1 may notably set the first parameter P1 as a fixed value based on the indicative value.

Figure 7:
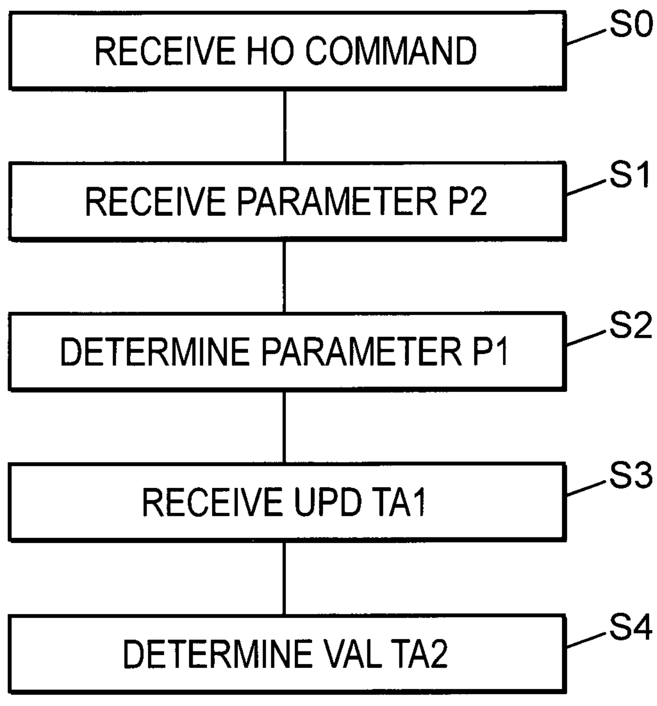
FIG. 7 is a flowchart illustrating steps of a method implemented by a user equipment to determine a value to be used as a timing advance in a target cell according to an embodiment of the invention.

It is now referred to FIG. 7. FIG. 7 represents a flowchart showing the main steps implemented by a user equipment UE1 to determine a value to be used as a timing advance TA2 in a target cell by the user equipment UE1.

Such user equipment UE1 is considered to be currently connected to a source base station BS3 of satellite SAT1 before implementing the steps of FIG. 7.

At step S0, the user equipment UE1 receives a message from the source base station BS3. Such message may refer to a handover command received by the user equipment UE1 based on which the user equipment UE1 will determine its value to be used as a timing advance TA2 in a target cell C6. Such message may include one or a combination of the following elements:

- the identity of one or several cells downstream to the source cell C3 within whom the user equipment UE1 may identify its target cell C6. The user equipment UE1 may also make measurements (for example of Reference Signal Received Power or RSRP) of the transmission power received from the several cell downstream to the source cell C3 in order to identify its target cell C6.
- a data related to a timing advance TA1 of the user equipment UE1 in the source cell C3, such data being estimated and/or measured by the source base station BS3 for a current or a future time,
- a data related to a cell switch time between the source cell C3 and the target cell C6,
- the overlapping time duration of the source cell C3 and the target cell C6 if the cell switch occurs in a soft cell switch scenario for instance,
- a data related to the time interval,
- a data related to a transmission pattern of first signals sent by the source base station BS3 such as a slot duration or a frame duration of the source base station BS3,
- a data related to a transmission pattern of second signals sent by the target base station BS6 such as a slot duration or a frame duration of the target base station BS6,
- an indicative value, such indicative value instructing the user equipment UE1 to determine the value to be used as a timing advance in the target cell C6 based on only the second parameter P2, the indicative value and potentially an additional fixed value predefined by the user equipment UE1. Such indicative value may be embedded in the message sent by the source base station BS3 in the case of a gateway switch of satellite SAT1 notably.
- a data related to a delay during which the user equipment UE1 does not send signals to the target base station BS6,
- a maximum time before which the user equipment has to perform the handover to the target cell C6 or a handover time $T_{HO}$, Upon receiving the message from the source base station BS3 through the source cell C3, the user equipment UE1 triggers a procedure to determine its value to be used as a timing advance TA2 in the identified target cell C6.

At a step S1, the user equipment UE1 receives a value of the second parameter P2 from the source base station BS3. Such step may also be merged with step S0 as the second parameter P2 may be embedded in the message sent by the source base station BS3 at step S0.

At step S2, the user equipment UE1 determines the first parameter P1, potentially based on the content of the message received from the source base station BS3 at step S0. The first parameter P1 determined by the user equipment UE1 may rely on:

- the data related to a cell switch time between the source cell C3 and the target cell C6, and/or
- the overlapping time duration of the source cell C3 and the target cell C6 if the cell switch occurs in a soft cell switch scenario for instance,
- the data related to a time interval, such time interval indicating to the user equipment UE1 a time window within which the times of arrival used by the user equipment UE1 to determine the first parameter P1 must be, and/or
- the data related to a transmission pattern of first signals sent by the source base station BS3 such as a slot duration or a frame duration of the source base station BS3, and/or
- the data related to a transmission pattern of second signals sent by the target base station BS6 such as a slot duration or a frame duration of the target base station BS6, in order to determine the first time and the second time to be used as a time difference which results in the first parameter P1.

The user equipment UE1 may also determine the first parameter at step S2 based on the indicative value if such indicative value is embedded in the message received at step S0.

At step S3, the user equipment UE1 obtains an updated value of the timing advance TA1 in the source cell C3 of the user equipment UE1. Such updated value of the timing advance TA1 in the source cell C3 may directly correspond to the data related to the timing advance TA1 of the user equipment UE1 in the source cell C3. Such updated value of the timing advance TA1 in the source cell C3 may also be determined by the user equipment UE1 based on the data related to the timing advance TA1 of the user equipment UE1 in the source cell C3, for instance in order to estimate the timing advance TA1 in the source cell at a future time. Such updated value of the timing advance TA1 in the source cell C3 of the user equipment UE1 may be received as a separate signal from the message and signal received at step S0 and S1 or may be received altogether with other data as previously mentioned. This step is optional, that is the updated value of the timing advance TA1 in the source cell C3 as known by the user equipment UE1 may be considered to be the latest available value of TA1 (potentially received before step S0 for example).

At step S4, the user equipment UE1, based on the second parameter P2, the first parameter P1 and the timing advance TA1 in the source cell C3 obtained at (possibly merged) steps S1, S2 and S3 respectively, is able to determine its value to be used as a timing advance TA2 in the target cell C6, for example by computing formula (1).

At step S5, the value to be used as a timing advance TA2 in the target cell C6 by the user equipment UE1 may be compared to the latest updated timing advance TA1 in the source cell of the user equipment UE1. If the time difference between the two values TA1, TA2 is above a threshold, such threshold being for instance predetermined by the network and received by the user equipment UE1 at step S0, the user equipment UE1 sends after step S4 the value to be used as a timing advance TA2 in the target cell C6 determined by the user equipment UE1 to the network.

Figure 8:
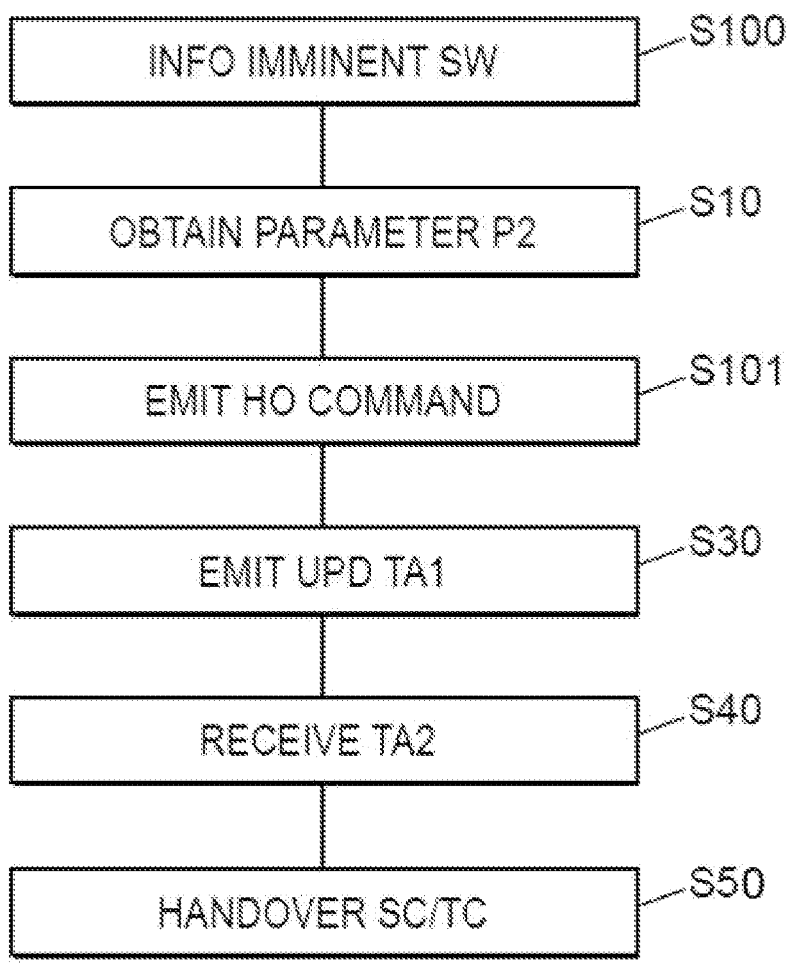
FIG. 8 is a flowchart illustrating steps of a method implemented by a satellite network to perform a handover according to an embodiment of the invention.

It is now referred to FIG. 8. FIG. 8 represents a flowchart showing general steps implemented by a network to perform a handover of a user equipment UE1 from a source cell C3 to a target cell C6. It is considered the fixed geographic region on the Earth surface and the part of the satellite communication network covering such fixed geographic region as represented on FIG. 5. The network includes satellites SAT1 and SAT2 projecting respectively cells C3 and C6 and corresponding to the respective base stations BS3 and BS6.

The base station BS3 of satellite SAT1 of the network is considered at a time when it covers the fixed geographic region including the user equipments UE1, UE2 and UE3. Such time can correspond to time T2' as represented on FIG. 5 but may also correspond to a time sooner or later than time T2'. Such time is for example sooner that time T3 as represented on FIG. 3.

The predefined satellite constellation dynamic as well as the network topology enable potentially any network entity, and particularly the base station BS3 of satellite SAT1 to predict at step S100 that the fixed geographic region currently covered by the cell C3 will encounter a change of coverage due to a cell switch between cell C3 and cell C6, which is deployed by another satellite SAT2. The cell switch conditions are also predictable by the base station BS3 and may include at least one or a combination of the following elements:

- information related to the identity of the cell which will replace cell C3 in the fixed geographic region, that is cell C6,
- information about the nature of the cell switch, that is the fact that an inter-satellite cell switch occurs,
- information related to a more or less progressive nature of the cell switch, for example in relation to the satellite beams B3 and B6 which are steerable or fixed,
- information related to a switch time between cells C3 and C6,
- information about the geographic zone covered by the downstream cell C6 throughout time,
- information about the hard or soft cell switch nature of the cell switch between cells C3 and C6,
- in the case of a soft cell switch scenario, information about the overlapping zone between the cells C3 and C6 (such as its location throughout time, the overlapping time duration for example).

Such information related to the cell switch between cells C3 and C6 may be predicted by base station BS3 at step S100 at a time before time T2' and may even be preconfigured within the hardware of the source base station BS3 as part of the network topology characteristics (that is, potentially before cell C3 covers the fixed geographic region).

At a step S10, the network determines a second parameter P2 which is specific to the cell C3 and the downstream cell C6. Such second parameter P2 may be determined by selecting at least a second user equipment UE2 within the coverage zone of cell C3 so as to obtain:

- a time shift TA2*−TA1* of timing advances of the second user equipment UE2 between its source cell and its target cell, and/or
- a value VAL specific to the second user equipment UE2.

The process launched by the second user equipment UE2 may be triggered by an indication message sent by base station BS3 of the network as detailed in the description of FIG. 5.

Step S10 may thus comprise the sending of an indication message to at least a second user equipment UE2 (or potential candidate user equipments to be selected as the second user equipment UE2) and the selection of the second user equipment UE2 based on which the base station BS3 will obtain the second parameter P2 at the end of step S10.

At step S20, the base station BS3 emits a message within its cell C3. Such message may contain:

- the information obtained by the base station BS3 at step S100, and
- the second parameter P2 obtained by the base station BS3 at step S10.

If the cell switch conditions obtained at step S100 enable the base station BS3 to identify a gateway switch scenario as represented on FIG. 6 for instance, the message may furthermore contain the indicative value and the second parameter P2 contained in the message may correspond to the time shift TA2*−TA1* of the timing advance of the second user equipment UE2 between its source cell and its target cell, as detailed in the description of FIG. 6 (wherein the time shift TA2*−TA1* corresponds to the time shift of the timing advance of user equipment UE2 between its source cell C3' and its target cell C3, such time shift TA2*−TA1* being then common to all UEs covered by satellite SAT1).

At step S20, the base station BS3 emits such message within its cell C3.

Such message may reach the user equipment UE1 as a broadcasted message at step S20 emitted by the base station BS3 in cell C3. Thus, the user equipment UE1 is covered by cell C3 but may not be connected to the base station BS3 yet when receiving such message.

Such message may reach the user equipment UE1 as a groupcasted message at step S20 emitted by the base station BS3 in cell C3. Such groupcasted message may be sent within the cell C3 based on a geographic criterion, for example to groupcast information related to the overlapping zone (such as the overlapping time duration) between cells C3 and C6 (providing that such overlapping zone is not empty) only within the overlapping zone. In such case of a groupcasted message based on the overlapping zone, user equipment UE2 on the one hand, and user equipments UE1 and UE3 will receive partially different messages from the base station BS3. Such message may also be sent in a groupcasted way if different downstream cells will replace the cell C3 and depending on a geographic criterion or a level of received transmission power for instance, UEs within different zones in the cell C3 will have to connect to different target cells. Thus, the user equipment UE1 is covered by cell C3 but may not be connected to the base station BS3 yet when receiving such groupcasted message.

The groupcasted message may also be sent at a time the user equipment UE1 is covered by cell C3 and connected to the base station BS3. Such groupcasted message may then be based on various criteria such as:

- a distance of the user equipment UE1 from a beam B3 center of the source cell C3, or
- a level of Reference Signal Received Power of the user equipment UE1, or
- a geographic zone.

Such message may reach the user equipment UE1 in a dedicated way as a unicasted message sent at step S20 by the base station BS3. Thus, the user equipment UE1 is covered by cell C3 and connected to base station BS3, which is the source base station BS3 of user equipment UE1. The unicasted message sent by the source base station BS3 to the user equipment UE1 may furthermore contain one or a combination of the following elements:

- a data related to a timing advance TA1 of the user equipment UE1 in the source cell C3;
- a data related to a time interval;
- a data related to a delay during which the user equipment UE1 does not send signals to the target base station BS6. Such delay may for example refer to a service pause timer of the user equipment UE1 in order to avoid transmissions interferences with other user equipments accessing the target base station BS6.
- a maximum time before which the user equipment UE1 has to perform the handover to the target cell C6. The maximum time before which the user equipment UE1 has to perform the handover to the target cell C6 enables the network to guarantee that the user equipment UE1 will actually pursue its communication with the network by performing a handover to the target cell C6 before losing connectivity.

Such further data contained in the unicast message may also be sent at a step S30 distinct from step S20. The source base station BS3 may thus send on the one hand, a groupcasted or broadcasted message at step S20 containing for example the information obtained at step S100, the second parameter P2 and an optional indicative value. Such groupcasted or broadcasted message sent at step S20 may be sent at a time when the user equipment UE1 is not connected to the source base station BS3 yet. On the other hand, the source base station BS3 may also send a dedicated message at step S30 containing data specific to the user equipment UE1, at a time when the user equipment UE1 is connected to the source base station BS3. The source base station BS3 may also send a unique dedicated message referring for instance to a handover command to the user equipment UE1 at a time when the user equipment UE1 is connected to the source base station BS3, the steps S20 and S30 being thus merged.

At this stage, the network (and more particularly the source base station BS3) has provided the user equipment UE1 with data so that the user equipment UE1 is able to determine its value to be used as a timing advance TA2 in the target cell C6, for example by computing the formula (1), such determination being dependent on the content of the message sent by the source base station BS3. Such message sent by the source base station at step S20 and S30 (possibly in a merged way) has been sent to the user equipment UE1 before the actual change of coverage between cells C3 and C6 occurs and so that the user equipment UE1 has enough time to trigger the determination of its value to be used as a timing advance TA2 in the target cell C6.

At a step S40, the source base station BS3 receives the value to be used as a timing advance TA2 in the target cell C6 of the user equipment UE1 before the user equipment UE1 has initiated its access procedure to the target base station BS6. Such value may be received directly by the source base station BS3 from the user equipment UE1 (if the user equipment UE1 is still covered by the source cell C3 for instance) or may be received by the target base station BS6 from the user equipment UE1 (if the value is determined by the user equipment UE1 after the cell switch and the user equipment UE1 is not covered by the source cell C3 anymore for instance), the target base station BS6 then possibly sending such value to the source base station BS3.

By receiving such value to be used as a timing advance in the target cell C6 by the user equipment UE1 beforehand (that is, before the handover at step S50), the network may allocate a reasonable amount of radio resources in order to perform the handover of the user equipment UE1 to the target cell C6 and may thus consume less radio resources compared to existing handover procedures.

At a step S50 at a time for example close to the handover time $T_{HO}$ and possibly taking into account the delay during which the user equipment UE1 does not send signals to the target base station BS6 such as a service pause timer, the network performs the handover of the user equipment UE1 from cell C3 to cell C6. The handover of the user equipment UE1 performed at step S50 uses the value to be used as a timing advance TA2 in the cell C6 of the user equipment and received by network at step S40. If the network does not receive the value to be used as a timing advance TA2 in the cell C6 from the user equipment UE1 before the time corresponding for example to the handover time $T_{HO}$ and possibly taking into account the data related to a delay during which the user equipment UE1 does not send signals to the target base station BS6 such as a service pause timer, the network may be computed to perform the handover of the user equipment UE1 at step S50 using the latest updated timing advance TA1 of the user equipment UE1 in cell C3.

The figures illustrate the case where satellites SAT1, SAT2 are equipped with steerable satellite beams B1' to B3', B1 to B6. However, the present disclosure also applies to satellites equipped with fixed beams. In such case, the handover conditions as well as the overlapping zones between a current cell and a downstream cell may differ and vary throughout time in a more progressive way as cells progressively move on the Earth surface. However, the determination of a value to be used as a timing advance in a target cell by a user equipment according to the present methods remains relevant and enables to optimize handovers of UEs within a satellite communication network in various handover scenarios.

The invention claimed is:

1. A method implemented by a user equipment to determine a value to be used as a timing advance in a target cell in a network comprising a satellite communication network, the user equipment being connected to a source base station corresponding to a source cell, the target cell corresponding to a target base station, the source cell and the target cell being supported by one or more satellites of the satellite communication network, at least the source cell being supported by a non-geostationary orbit satellite of the satellite communication network, said method comprising:

determining the value to be used as a timing advance in the target cell, before the user equipment transmits a first signal to the target base station, based on:

a data related to a timing advance in the source cell, a first parameter, said first parameter being determined by the user equipment, and a second parameter, said second parameter being received by the user equipment, said second parameter being specific to a couple of cells formed by the source cell and the target cell.

2. The method according to claim 1, wherein the first parameter is determined based on times of arrival at the user equipment of:

a first signal received from the source base station, through the source cell, and a second signal received from the target base station, through the target cell.

3. The method according to claim 2 further comprises determining the first parameter based on:

a first time determined based on the time of arrival of the first signal, the first time being in a time interval, a second time determined based on the time of arrival of the second signal, the second time being in the time interval.

4. The method according to claim 1, wherein the second parameter relates to a desynchronization offset between the source base station and the target base station.

5. The method according to claim 1 further comprises sending the value to be used as a timing advance in the target cell to the source base station.

6. The method according to claim 5, wherein the user equipment sends the value to be used as a timing advance in the target cell if the gap between the timing advance in the source cell and the value to be used as a timing advance in the target cell is above a threshold.

7. The method according to claim 1 further comprises receiving from the source base station:

a data related to a delay during which the user equipment does not send signals to the target base station; and/or a maximum time before which the user equipment has to perform a handover to the target cell.

8. A user equipment configured to determine a value to be used as a timing advance in a target cell in a network comprising a satellite communication network, the user equipment being connected to a source base station corresponding to a source cell, the target cell corresponding to a target base station, the source cell and the target cell being supported by one or more satellites of the satellite communication network, at least the source cell being supported by a non-geostationary orbit satellite of the satellite communication network, the user equipment comprising:

a processor, and a non-transitory computer-readable medium comprising instructions stored thereon, which, when executed by the processor, configure the user equipment to determine a value to be used as a timing advance in the target cell before connecting to the target base station based on:

a data related to a timing advance in the source cell, a first parameter, said first parameter being determined by the user equipment, and a second parameter, said second parameter being specific to a couple of cells formed by the source cell and the target cell.

9. A method implemented by a network to perform a handover of a user equipment from a source cell to a target cell, the network comprising a satellite communication network, the source cell corresponding to a source base station and the target cell corresponding to a target base station, at least the source cell being supported by a non-geostationary orbit satellite of the satellite communication network, the method comprising:

determining a parameter, said parameter being related to a value specific to a couple of cells formed by the source cell and the target cell, sending said parameter to at least the user equipment, performing the handover of the user equipment from the source cell to the target cell;

wherein a value to be used as a timing advance in the target cell by the user equipment is dependent on said parameter and a timing advance in the source cell of the user equipment.

10. The method according to claim 9, wherein the parameter is determined based on at least:

a data related to timing advance of a second user equipment in the target cell, a timing advance in the source cell of the second user equipment.

11. The method according to claim 10 further comprises receiving a value from the second user equipment, said value being dependent on times of arrival at the second user equipment of:

a first signal received from the source base station, through the source cell, and a second signal received from the target base station, through the target cell, wherein the parameter is determined based on said value.

12. The method according to claim 11 further comprises selecting the second user equipment such as the value received from the second user equipment is below a threshold.

13. The method according to claim 10 further comprises selecting the second user equipment such as:

the gap between a timing advance of the second user equipment in the target cell and a timing advance of the second user equipment in the source cell is below a threshold, and/or the second user equipment is in a predetermined geographic zone.

14. The method according to claim 9 further comprises sending from the source base station to the user equipment a message comprising:

a data related to a timing advance of the user equipment in the source cell; and/or a data related to a time interval; and/or an indicative value; and/or a data related to a delay during which the user equipment does not send signals to the target base station; and/or a maximum time before which the user equipment has to perform the handover to the target cell.

15. A network configured to perform a handover of a user equipment from a source cell to a target cell, said network comprising a source base station and a target base station, the network comprising a satellite communication network, the source cell corresponding to the source base station and the target cell corresponding to the target base station, at least the source cell being supported by a non-geostationary orbit satellite of the satellite communication network, the network being configured to:

determine a parameter, said parameter being related to a value specific to a couple of cells formed by the source cell and the target cell, send said parameter to at least the user equipment, perform the handover of the user equipment from the source cell to the target cell;

wherein a value to be used as a timing advance in the target cell by the user equipment is dependent on said parameter and a timing advance in the source cell of the user equipment.

16. A computer program product comprising program instruction code stored on a non-transitory computer-readable medium for the execution of:

the method according to claim 1.

* * * * *